United States Patent [19]

Tokas

[11] Patent Number: 5,104,210
[45] Date of Patent: Apr. 14, 1992

[54] LIGHT CONTROL FILMS AND METHOD OF MAKING

[75] Inventor: Edward F. Tokas, Creve Coeur, Mo.

[73] Assignee: Monsanto Company, St. Louis, Mo.

[21] Appl. No.: 342,258

[22] Filed: Apr. 24, 1989

[51] Int. Cl.$^5$ .................. G02B 26/00; G02F 1/01; B05D 3/14
[52] U.S. Cl. ................................. 359/296; 427/47
[58] Field of Search ............... 350/355, 362, 276 R; 427/47, 128, 130, 372.2

[56] References Cited

U.S. PATENT DOCUMENTS

| | | | |
|---|---|---|---|
| Re. 27,617 | 4/1973 | Olsen | 161/6 |
| 3,927,930 | 12/1975 | Goldberg et al. | 427/47 |
| 3,972,593 | 8/1976 | Appeldorn et al. | 350/276 R |
| 4,082,433 | 4/1978 | Appledorn et al. | 350/211 |
| 4,548,862 | 10/1985 | Hartman | 428/323 |
| 4,764,410 | 8/1988 | Grzywinski | 428/120 |
| 4,766,023 | 8/1988 | Lu | 420/120 |
| 4,772,096 | 9/1988 | Kai et al. | 350/276 R |
| 4,772,097 | 9/1988 | Takeuchi et al. | 350/319 |

FOREIGN PATENT DOCUMENTS 272582 6/1988 European Pat. Off. .

OTHER PUBLICATIONS

S. Jin, et al., New, Z-Direction Anisotropically Conductive Composites; J. Appl. Phys., vol. 34, No. 10, Nov. 1988.

3M Light Control Film-98-0439-4252-7 (125) R1 XY, referencing Industrial Optics/3M, Bldg. 223-4W, 3M Center (612) 733-4403.

Ordering Phenomena of Particles Dispersed in Magnetic Fluids (invited); Y. Shapira, Chairperson, Critical Phenomena 1; A. T. Skjeltorp, Instit. for Energy Tech., J. Appl. Phys. 57(1), 15 Apr. 85, Amer. Inst. of Physics.

Particle Cluster Configuration in Magnetic Fluids, Letter to the Editor, J. Phys. D: Appl. Phys., 13(1980): –119–22.

One-and Two-Dimensional Crystallization of Magnetic Holes; 1983 Amer. Phys. Soc., A. T. Skjeltorp, Inst. for Energy Tech., vol. 51, 1983.

Primary Examiner—Eugene R. LaRoche
Assistant Examiner—Evelyn A. Lester
Attorney, Agent, or Firm—Thomas E. Kelley; Richard H. Shear

[57] ABSTRACT

Radiation transmission control films comprising closely spaced agglomerates of small particles, e.g. in linear, side-by-side louvers, in a solid matrix where the agglomerates exhibit different radiation permeability than the matrix. Methods of making such films include magnetically aligning particles into louvers in an uncured matrix then curing the matrix to provide louvered film. Such films are useful to control the transmission of light, other electromagnetic radiation and particle radiation.

42 Claims, 20 Drawing Sheets

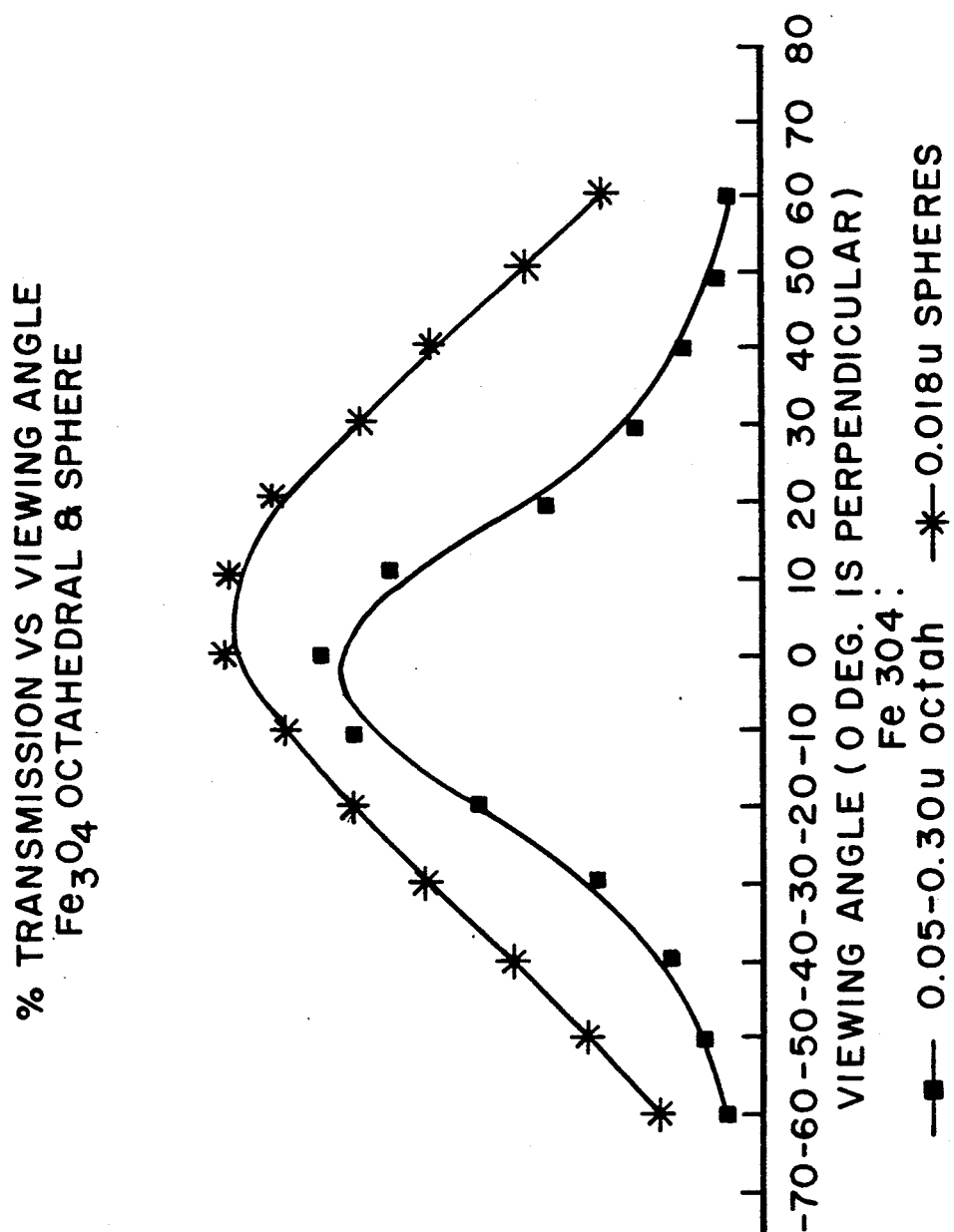
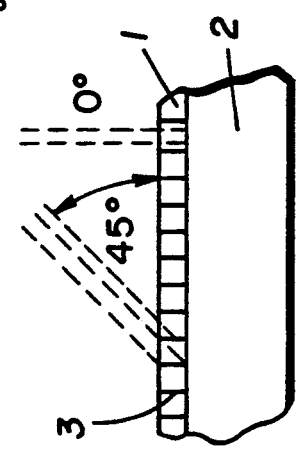

28,300 cps 92,000 cps

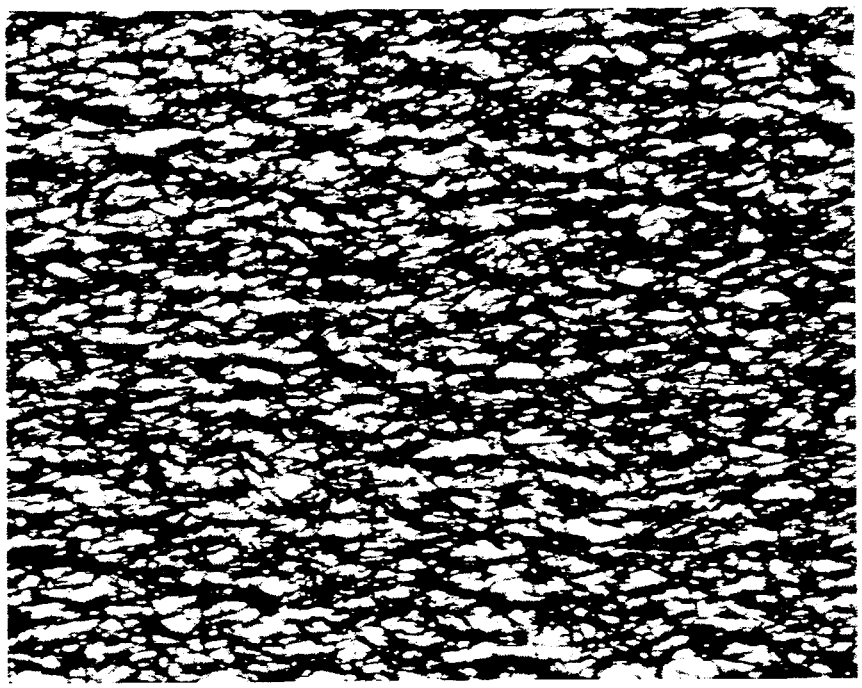
FIG. 7. 115 cps
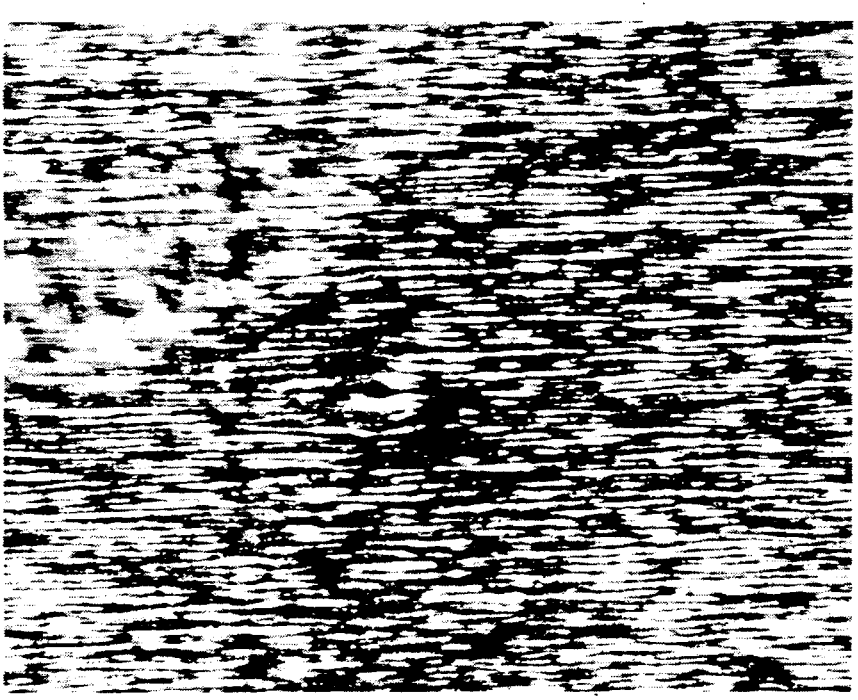
FIG. 6. 15,960 cps 37.2 cps

250 G

430 G

150 G

200 G

Fe₃O₄ 0.028/cc

FeO₄ 0.019/cc

Fe$_3$O$_4$ 0.5G/cc

Fe$_3$O$_4$ 0.10G/cc

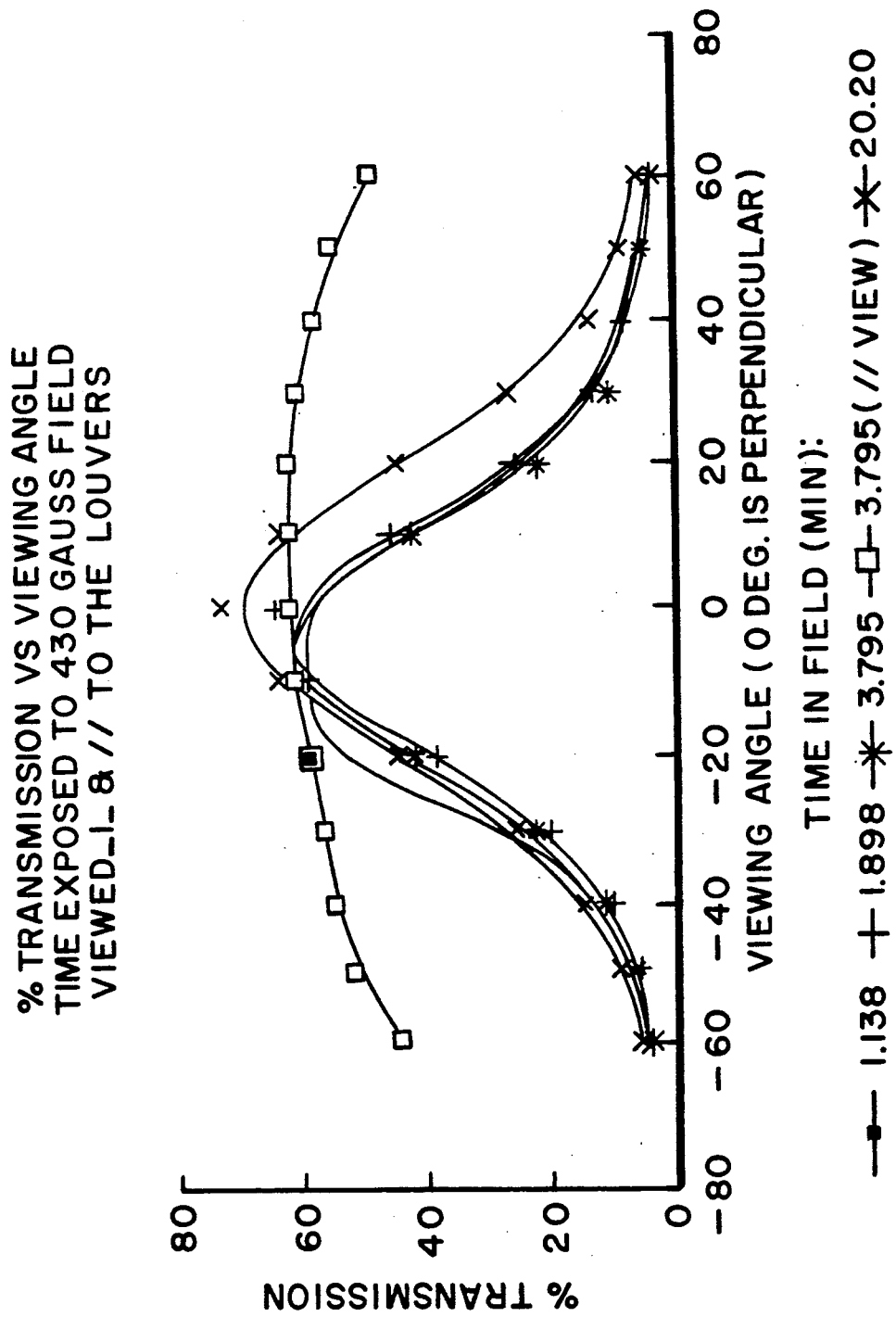

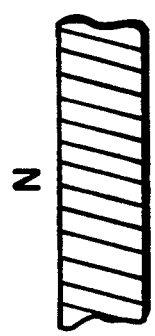
FIG. 26A. TIME n
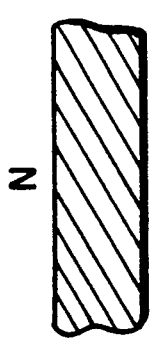
FIG. 26B. TIME 2n
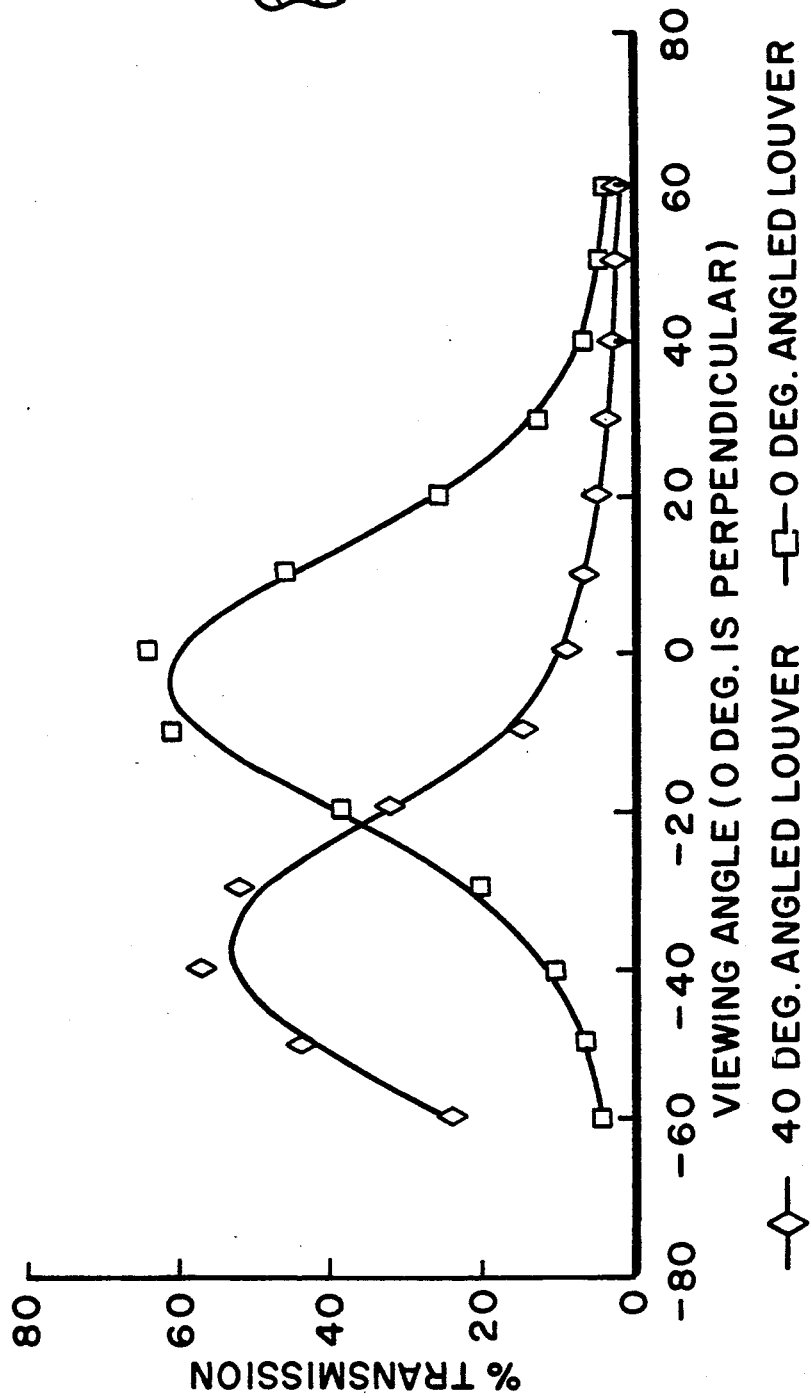
FIG. 25.

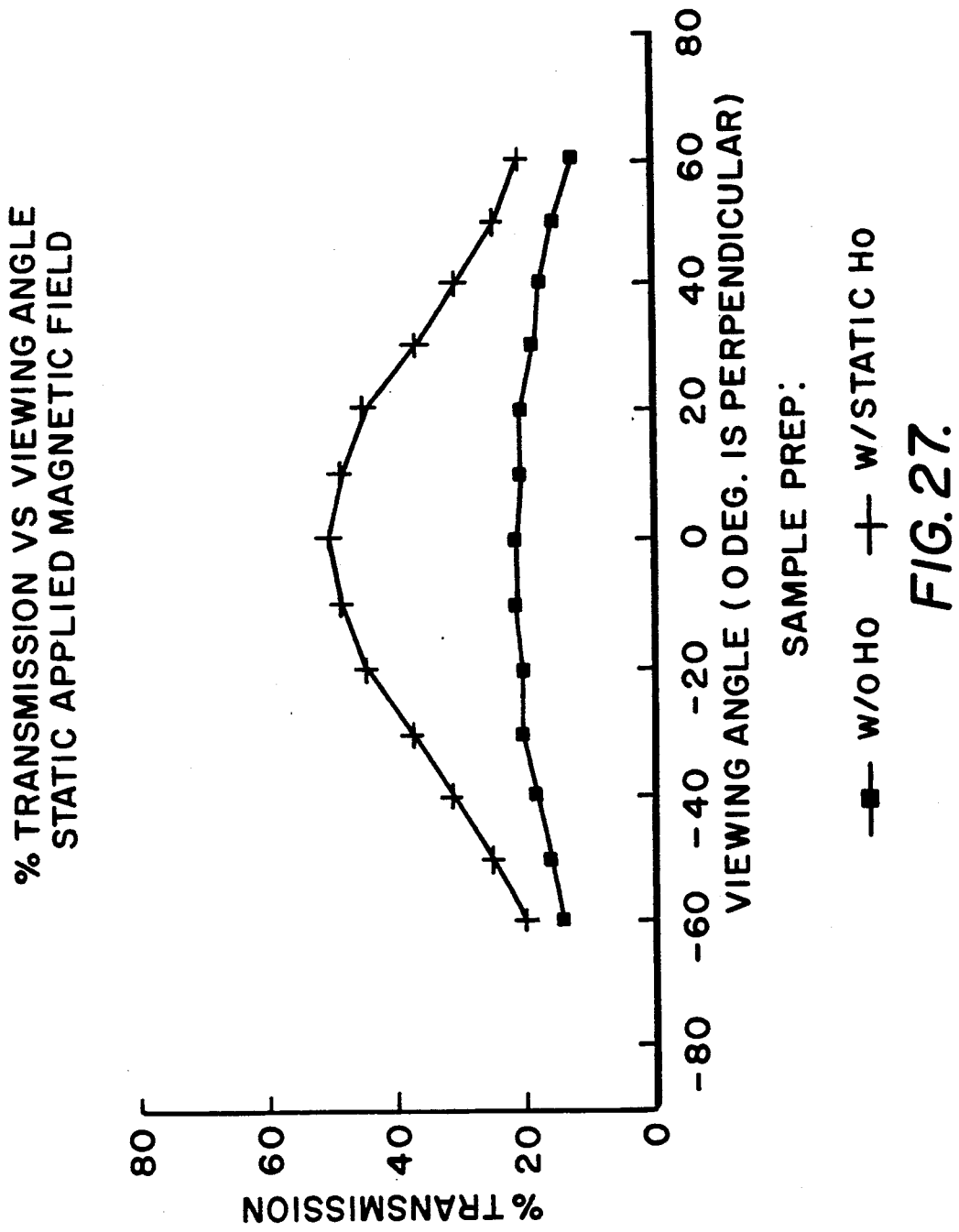

LIGHT CONTROL FILMS AND METHOD OF MAKING

The present invention relates to films which contain closely spaced agglomerates of small particles, which serve to selectively control light (or other radiation) transmissions as a function of the angle of incidence. The invention also relates to a method of aligning particles in a film by subjecting a viscous medium containing the particles to a magnetic field, and subsequently curing the medium.

BACKGROUND OF THE INVENTION

A patent to Land, 1,955,923, concerns a light valve involving a dispersed mass of polarizing particles suspended in a light-transmitting medium, and applying to said particles an electrically controlled field of force, whereby the absorption of a light beam within the suspension may be altered. The polarizing bodies preferably employed are relatively small crystals. The crystals used should have some physical property which is susceptible to the field of force to be applied. When a magnetic field is employed the crystals turn or rotate in the suspension so their axes tend to orient similarly.

In accordance with Goldberg et al U.S. Pat. No. 3,927,930, finely divided ferrite particles, e.g. having a particle size of about 0.02 micron in diameter, are suspended in a light-transmitting inert medium, preferably water, on a transparent support. A magnetic field is applied to the ferrite suspension whereupon the ferrite particles orient themselves in the medium to form elongated, line-shaped agglomerates which polarize visible light passing through the magnetized suspension. The medium may, for example, comprise a polymerizable monomer which may be polymerized while in the magnetic field to freeze the ferrites in the oriented attitude in the solid polymeric medium. Photomicrographs were said to show regular line-shaped agglomerates of ferrite particles about 0.4 microns apart.

Ordering phenomena of particles, polystyrene spheres, in magnetic fluids have been studied, see A. T. Skjeltorp, J. Appl. Phys. 57 (1), pp. 3285-3290, 15 Apr. 1985, and Physical Review Letters, 51 (25), pp. 2306-2309, Dec. 19, 1983. Particle configurations in magnetic fluids have been described by R. W. Chantrell et al, J. Phys. D:Appl. Phys. 13 (1980) L119-2.

A 3M Light Control Film has been described in a brochure 98-0439-4252-7 (125) R1 XY, referencing Industrial Optics/3M, Building 223-4W, 3M Center, St. Paul, Minn. 55144-1000, 612/733-4403. The brochure illustrates a film with 0.030 inch (762 microns) thickness with light control louvers stated to be 0.0005 inch (12.6 microns) thick and 0.005 inches (126 microns) or 0.010 inches (252 microns) spacing. U.S. Pat. No. 4,082,433, assigned to Minnesota Mining and Manufacturing Company, states that internally louvered sheets can be made by skiving a continuous web from a cylindrical billet that has been prepared by compressing an assembly of alternate circular layers of clear polymeric material and black or other opaque or transparent colored layers. To improve the clarity of the product, clear films may be laminated or coated on each side of the skived web. U.S. Pat. No. Re. 27,617, assigned to Minnesota Mining and Manufacturing, further describes the manufacture of such film.

U.S. Pat. No. 3,707,416 has an object to produced louvered films having uniform angles of louvers from the vertical, and a process involving skiving from a skewed billet. U.S. Pat. Nos. 4,764,410 and 4,766,023 concern composite structures involving coating of louvered films, and cite a number of prior patents relating to louvered films and their applications. U.S. Pat. No. 4,772,096 concerns a light-shader intended to prevent reduction of contrast ratio of views in a display, generation of moires and devastion of images in the views. The light shader includes a light-shading film on a light-transmissive substrate plate. The light-shading film includes a plurality of opaque walls standing along its thickness and defining corresponding light-transmissive cells. Such opaque walls can be formed by opaquely dyeing a set photosensitive resin and transparent cells by eliminating and unset photosensitive resin by alkaline cleaner to form micro-openings. U.S. Pat. No. 4,772,097 concerns a light control sheet comprising transparent layers and reflection layers interposed between the walls of opaque louver elements. Preparation methods include slicing a material which has lamination layers and photoetching.

SUMMARY OF THE INVENTION

The invention involves light control films in which the films contain side-by-side louvers or walls composed of agglomerates of small light absorbing, reflecting or refracting particles. The description and exemplification herein will mainly concern control of visible light transmission, but it is to be recognized that the invention is also applicable to control of transmission of other forms of radiation energy, such as from the ultraviolet, infrared or other regions of the electromagnetic spectrum, and particle radiation alpha-rays such as electron radiation. In further detail the films comprise louvers closely spaced (like ventian blinds) with louver heights often being approximately the order of, equal to or greater that the space between louvers. The distances between louvers are generally no more than about 50 microns and often about 5 to 20 microns, with the louver heights being up to 50 to 75 microns, or approximately equivalent to the film thickness, or down to 10 microns or so. The louvers selectively block or otherwise affect the transmission of light, depending upon the angle at which the light strikes the film surface, with louvers of relatively greater height generally serving to affect the light transmission more. The films can achieve transmission of more that 70% of impinging light at the most favorable angle, with graduation down to near negligible transmission at less favored angles. The louvers can be angled perpendicular to the surface of the film, in which case the maximum transmission will be obtained for light striking the film surface generally in a perpendicular direction. However, the louver can also be aligned at other angles to the film surface, thereby permitting the maximum light transmission at such selected other angle, with transmission of light at angles other than the selected angle being reduced, generally to an extent relative to the departure from the selected angle. The louvers are composed of agglomerates of small particles of material, generally in the very small or micro range such as 1 micron, or usually less, and preferably well formed into separate louvers, but often with some discontinuities and extraneous positioning, depending upon the method of formation. The height and completeness of the louvers can also vary with the concentration of particles in the film and the forces used for alignment. The louvers can be aligned in a side-by-side or generally parallel formation, and the films accordingly can reject light (at selected angles of incidence) striking the film from a direction perpendicular to the long dimension of the louvers, but permit transmission of light from a direction parallel to the long dimension of the louvers, with graduation of the extent of transmission from directions between perpendicular and parallel. This directional effect is, of course, much more significant for light impinging angles other than the angle for maximum transmission, for example, at 50° from the perpendicular with a film where maximum transmission is obtained at perpendicular. Such a film can be termed anisotropic in view of the directional alignment of the louvers and the resulting directional effect on light transmission.

The louvers are composed of agglomerates of particles which can affect the transmission of light i.e. are optically limiting, and may be opaque or substantially opaque materials to block transmission, or translucent or transparent to deflect or reflect light rays for special effects. For suitability for alignment by magnetic forces, the particles are desirably such as to be capable of alignment by magnetic forces, with ferrites being particularly suitable, and also ferromagnetic materials.

In another aspect, the fluid film material can be subjected to a static magnetic field, thereby producing agglomerates aligned in the direction of the field, as the production of rod-shaped agglomerates aligned normal to the film surface from response to a static magnet with one pole above, or above and below, and parallel to the film surface.

The various film embodiments above can generally be used for controlling transmission of radiation other than visible light, provided that the matrix material is at least partially permeable to the particular radiation, and the agglomerate material is less permeable to the particular radiation than is the matrix material; or alternatively, that the matrix material and agglomerate material simply differ in permeability with respect to particular radiation.

The invention also involves methods of affecting or controlling the transmission of light rays by permitting the light rays to strike a thin film containing internal louvers, particularly by filtering out some rays while permitting others to pass through the film depending upon the angle of incidence. The thin film louvers are composed of small particles of light absorbing, refracting or reflecting materials, thereby selectively interfering with or preventing transmission of certain rays, particularly in accordance with the angle at which rays impinge upon the film. The method is capable of a high degree of selectivity, such as transmission of more than 70% at angles of maximum transmission, varying down to less than 20% at angles of 60° or more away from maximum transmission angles. The transmission can be controlled selectively by positioning of the film with respect to the light sources, or by selected angling of the louvers within the film. The light reaching a viewer on the opposite side of the film can be controlled in the same manner.

Reference to affecting or controlling light herein is to be considered generic to affecting or controlling light rays from a light source striking the film, or affecting or controlling light rays as perceived by a viewer (or instrument or area) perceiving a portion of incident light which passes through the film. In some cases, the light may pass through a film at one angle, be reflected back through the film and be perceived by a viewer depending upon the angle at which he views the film, as when a film is placed over a white paper.

The invention also includes a method of aligning small particles of material in a viscous medium into the form of light absorbing agglomerates, and then fixing such form by solidifying the medium. The method employs magnetic force for such alignment and particles capable of alignment by such force. The method generally involves subjecting a thin viscous, form-retaining transparent film material, e.g. of polymerizable or curable material, containing an appropriate concentration of magnetically alignable particles, to a moving magnetic field, of sufficient force and for sufficient time, to align the particles into louvers. The louvers are then fixed in position by converting the viscous film material into more stable form, as by curing or completing polymerization or removing a viscosity-controlling solvent or lowering the temperature to raise the viscosity. The invention in making anisotropic films involves subjecting a thin supported viscous medium containing alignable particles to relative movement with respect to magnetic fields to align the particles into louver-like structures with long dimension in the direction of movement, as by passing the supported medium over a magnet or magnets for sufficient time to obtain the desired alignment in the direction of passage. The concentration of the particles is sufficient to permit the formation of closely-spaced louvers to achieve desired control, while avoiding excessive concentrations which result in undue presence of unaligned particles between louvers to interfere with transmission. It is possible in the present invention to utilize relatively thin films of viscous medium, such as 50 microns or less, and to form louvers in side-by-side relationship less than 50 microns apart and of height approaching that of the film thickness. The viscous material has viscosity such that particles can be aligned therein and the alignment retained while being affixed as by curing the material. The material can be cured quickly during or immediately after the magnetic force treatment in order to retain maximum alignment, and with the louvers generally angled perpendicular to the surface of the film. In a particular embodiment, the curing can be delayed to permit the louvers to turn in concert after the magnetic field exposure and to be angled at angles other than perpendicular to the film surface.

The present invention is concerned with means for controlling the transmission of light, particularly by permitting high transmission of light incident at some angles while substantially rejecting transmission incident at other angles. The concept is schematically illustrated in FIG. 1 in which a light controlling coating 1 is supported on a transparent substrate 2 and contains internal louvers 3 composed of agglomerates of iron oxide particles. With a theoretically infinitely thin and totally light absorbing louvers, the maximum allowable distance between louvers which will still totally block rays incident at 45°, is equal to the louver height, which can approach the film thickness. Thus, for a coating 50 or so microns in thickness, the louvers can be no more than 50 mircons apart if 45° rays are to be completely blocked. As illustrated, rays impinging perpendicularly, i.e. at 0° from vertical, can pass through the coating. The line spacing and height can be varied to permit some of the 45° rays to be transmitted, and to affect the transmission of rays at greater or lesser angles of incidence. In FIG. 1 the louver height as illustrated is equivalent to the film thickness. Even if the louvers are angled from vertical, the same dimension will still be referred to herein as the height of the louver. In practice, the louvers will not be completely contiguous and may be composed of materials which are not completely light absorbing, so that light rays are not completely blocked. It will be generally desirable that the matrix material containing the louvers will be of light transmitting, transparent material in order to permit a high degree of transmission of light between the louvers. The light control materials are suitable for various purposes, with one of great intereset being use in building windows to block sunlight and needless heating of the building, while permitting good visibility.

The transparent matrices used herein will generally be fairly permeable to radiation outside the visible light ranges, such as ultraviolet and infrared radiation. Also, the agglomerate materials, particularly the magnetically alignable materials, will be fairly opaque to radiation outside the visible ranges. In addition, numerous pairs of matrix and agglomerate material will differ sufficiently in degrees of transmission of various wave length or particle transmission as to permit use in the present invention for selective angular filtration.

For example, transmission of X-rays through materials will generally be increasingly inhibited as materials of increasingly higher density are employed. Thus X-rays can be transmitted fairly readily through a plastic matrix material, such as polyurethane, but are only poorly transmitted through such metal-containing (metalliferous) materials as magnetite, and very poorly through lead or noble metals. Filters for filtering light and other electromagnetic radiation in accordance with wave length can be employed in the present invention, particularly as matrix materials. For example, dielectric interference filters and glass color filters can be used, selecting filters which block rays from X-ray to far infrared, as from 1000 angstroms through 100,000 angstroms, but permit transmission in a narrow band, such as a band with a half-band width of about 10 nanometers. Also, longpass or shortpass color filters can be employed to transmit only in the longwave region or only in the shortwave region. Louver-agglomerate material can then be selected to impede transmission of the rays which are transmitted through the matrix material. Alternatively, louver-agglomerate materials can be selected which transmit (or impeded less) rays which are impeded by the matrix material, thereby making the thickness of the matrix material between louvers the primary determinant of transmission as a function of angle of incidence. In such embodiments and other applications it is also possible to use filters which reject substantially all visible light but pass higher and lower wave lengths, e.g. infrared or ultraviolet wavelengths, or filters which pass only visible light.

DESCRIPTION OF THE DRAWINGS

FIG. 1 is an illustration of a film supported on a substrate and having louvers. FIGS. 2, 3, 9, 15 through 17, 23 through 25 and 27 are graphs of the percent of light transmission vs. viewing angle, for various films prepared as described herein. FIGS. 4 through 8, 11 through 14, and 19 through 22 are microphotographs of various films illustrating particle alignment. FIGS. 26a and 26b illustrate films with sets of louvers at different angles.

DETAILED DESCRIPTION

Figure 3:
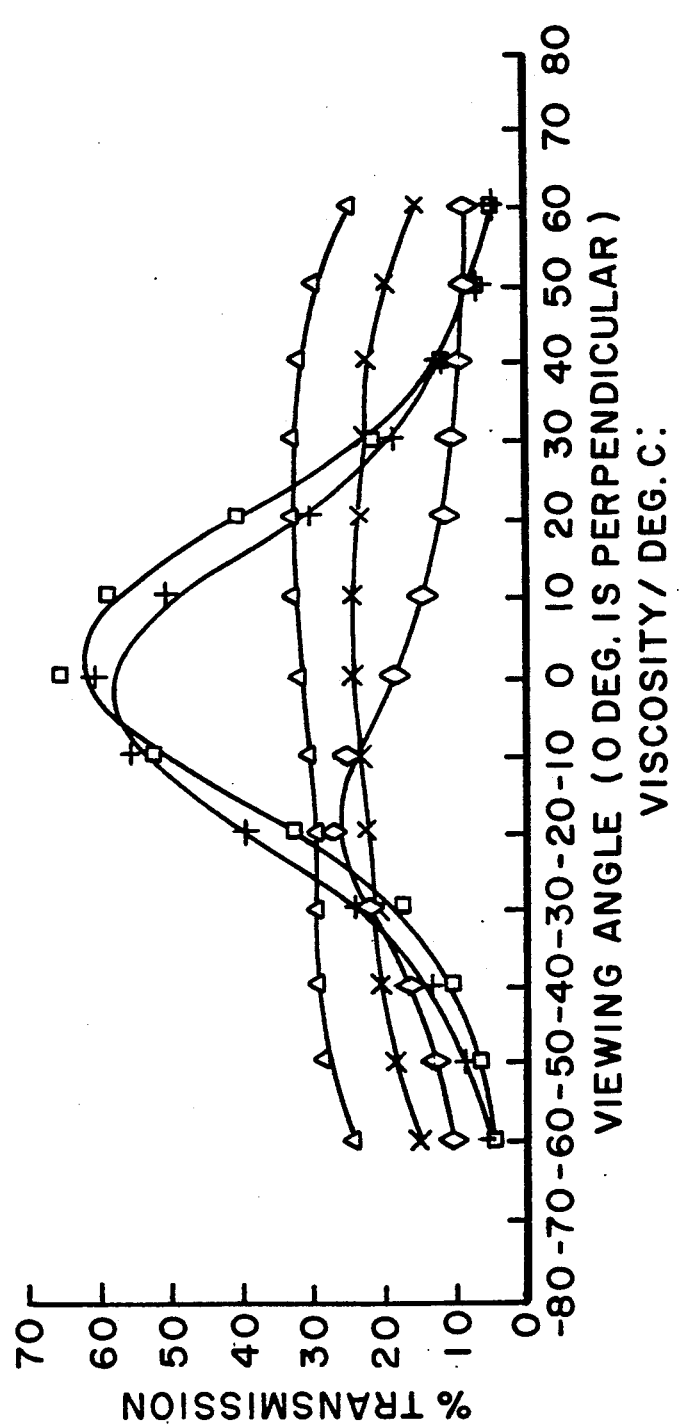
Figure 5:
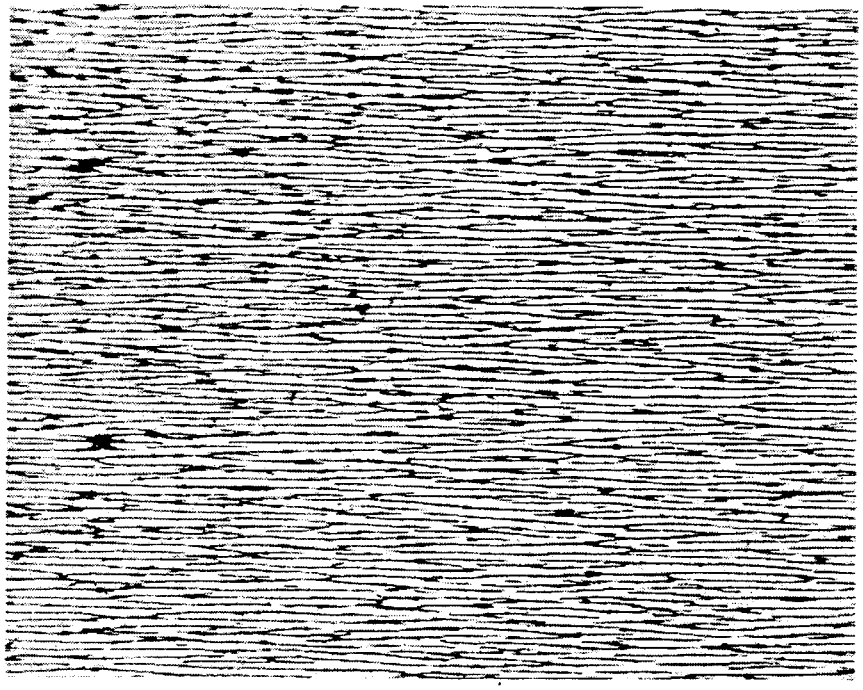
Figure 4:
Figure 8:
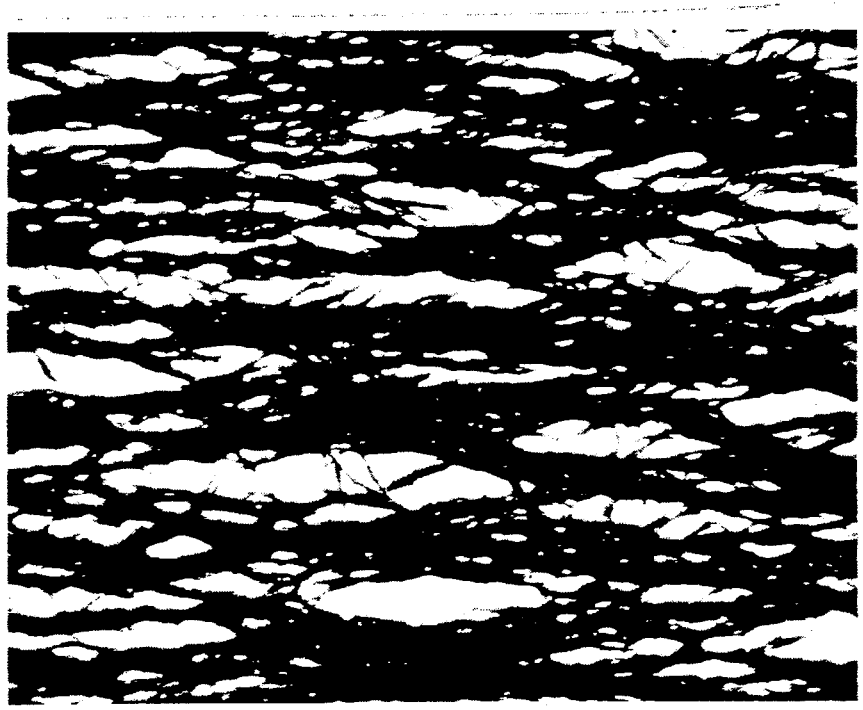

The agglomerates in the films herein have appreciable thickness and, when of opaque or similar material, can block a high degree of light impinging thereon. In one preferred embodiment, the agglomerates are in the form of louvers, resembling venetian blinds, with the agglomerates being in the shape of walls of appreciable thickness, but generally relatively thin compared to their height. However the agglomerates can also be in the form of walls of lower height, such as walls of approximately square, circular or hexagonal cross section, and resembling rods or monofilament materials. The rods or walls can also be aligned normal to the film's surface, rather than parallel thereto. Conventional coating and extrusion techniques can be employed in the preparation of viscous particle-containing matrixes for use in the present invention and conversion to stable light transmission materials. A viscous fluid medium is employed and converted to solid form by a selected means, e.g. polymerization, cross-linking, solvent evaporation, etc. Polymerizable monomers, especially oligomers, which can be converted readily into stable, light-transmitting polymeric films, are particularly suitable. Various polymeric or pre-polymeric materials can be used, e.g. polyurethanes, acrylics, methacrylics, polyesters, e.g. glycol-phthalate esters, nylons, polyolefins, and various other thermoplastic and thermosetting resins, particularly organic polymer resins. Glasses and other film forming materials can be used, including sodium polysilicate and usual commercial glasses and special purpose glasses. Particles can be magnetically aligned if the Curie temperature (i.e. the temperature where spontaneous magnetization disappear) is above the melting point of the matrix. There are low melting glasses that can be used, e.g. $B_2O_3$ and certain silicate glasses have melting points below the Curie temperatures of Fe (770° C.) and $Fe_3O_4$ (585° C.). For melting points, see Silicate Sci., Eitel, II Glasses, Enamels, Slags, pp. 66-67, FIG. A59 (546.683 EIS). The present invention can employ conventional coating, molding, extrusion, injection, and forming procedures, but involves incorporating small concentrations of alignable particles into the formable matrices, and aligning the particles and fixing the alignment.

In preparing the present light control materials, it will be convenient for high volume operations to employ continuous procedures in which materials are transported through various stages for sequential operations, as on a moving belt for coating, alignment, and curing operations. In such procedures a coating can conveniently be applied to a pre-prepared, solid supporting film and subsequently cured as an adherent layer on such support to provide a composite film product. However it is also possible to prepare strippable coating materials which can be formed into free-standing film materials, or to employ other means to obtain free-standing films or filaments. The coating procedures can involve such conventional methods as wire rod coating, air-knife coating, slot-orifice coating, knife-over-roll coating, reverse roll coating, and gravure and reverse direct gravure. See Roll Coating by R. T. Schorenberg, Modern Plastic Encyclopedia, 1984-1985, pp. 202-203, which is incorporated herein by reference.

It is a feature of the present invention that very thin films, i.e. of the order of 2 mils or less (approximately 50 microns or less) can be used to achieve desired light-filtering effects. The suitability and economy of such thin films will be an advantage in many applications. Also with such thin films as a coating on somewhat thicker supporting films, a still relatively thin film is provided for use. Films have many recognized uses in light transmission and related purposes, and films, characterized by being relatively thin in one dimension, e.g. thickness, but relatively great in another dimension, e.g. width, are an important form for use of the present invention. However the present invention can also involve other forms of light control materials, such as relatively thick blocks of material, or filaments of circular or other relatively symmetrical shapes. The films are often relatively flexible, but can also be prepared in rigid forms.

In various application it may be convenient to employ the light control materials of the present invention as an adherent layer or interlayer in other light control materials, e.g. in architectural glass or automobile windshields or windows.

EXAMPLE 1

The performance of the materials of the present invention in transmitting light can be illustrated by a graph of the percentage of light transmitted as a function of the viewing angle as illustrated in FIG. 2. Perpendicular to the surface is taken as zero degrees and the other angles are measured by difference from perpendicular. The curves illustrate the rapid drop in transmission as the viewing angle changes from perpendicular (0°) to either plus or minus 60°C., for films prepared with the indicated octahedral and spherical particles. The maximum slope of the percent transmission curve, hereby defined as the efficiency, provides a basis for comparison of performance as it concerns the rate (maximum) at which transmission changes with change of viewing angle. In addition to the efficiency factor, the percent of maximum transmission is also important, as it is desirable in many applications to have a high degree of transmission at a selected angle. The graphs of FIG. 2 involve transmission results on two films prepared by the same procedures, but with one using 0.05–0.30 micron octagonal magnetite particles, and the other using 0.018 micron spherical magnetite particles.

The light control films were prepared as follows, utilizing 0.1 gram of magnetite per cc of film. A viscous formulation was prepared containing components as follows:

| Component | wt. | pph monomer |
|---|---|---|
| Ebycryl 285 (urethane prepolymer) | 25.0 | 100 |
| Fe$_3$O$_4$ | 2.5 | 10 |
| Irgacure 184 (curing agent) | 0.5 | 2 |
| Acetone | 12.5 | 50 |

A mixer mill was utilized which had a hardened steel cylinder and two ½ inch (1.27 cm) and four ¼ inch (0.64 cm) steel balls. The mill was charged with the formulation components and placed on a shaker mill for 15 minute cycles, on and off, for a total shake time of 60 minutes. The formulation was then coated on a 4.0 mil (101.6 micron) polyethylene terephthalate plastic sheet using a metering bar with a gap of 4 mils to provide a dry film thickness of about 1.3 to 1.7 mils (33.02 to 43.18 microns). The plastic sheet carrying the 4 mil uncured formulation was then passed over the face of a permanent magnet to orient the magnetite particles. The sheet was passed across the face of the magnet 200 times at a speed of 17.8 feet/minute (5.43 meter/minute) for a total exposure time of about 3.3 minutes. The sheet was in contact with, or close proximity to, the magnet face in order to have a strong magnetic field. The magnet was a permanent bar magnet, being an oriented ceramic VIII magnet, having a magnetic flux density of 3850 gauss, and dimension of 14 inch (35.56 cm) by 3½ inch (8.89 cm) by ¾ inch (1.91 cm). The plastic sheet, 11 by 14 inches (27.54×35.56 cm), was passed across the north (or south) face of the magnet in a direction (long dimension) perpendicular to the long dimension of the magnet at the specified speed a total of 200 times. (The passes can all be in the same direction, or the direction can be reversed, utilizing back and forth passes.) The open circuit field was measured by a gauss meter at 430 gauss. (The field can be varied by varying the distance of the plastic sheet from the face of the magnet.) The sheet was then removed from the field and passed once at a speed of 80 feet/minute (24.4 meters/minute) under an ultraviolet light (0.066 joule/cm$^2$) to effect a cure of the polymerizable material in the film formulation, thereby preserving the alignment of the magnetite particles. The magnetite particles were aligned into agglomerates in the form of louvers oriented in the direction of the passage through the magnetic field.

In the polymerizable formulation the Ebycryl 285 urethane monomer is a 75% aliphatic urethane diacrylate as 75% solids in tripropyleneglycol diacrylate, with a viscosity of 28,300 centipoises, available from Radcure Specialities in Norfolk, Virginia. The acetone, present as a carrying solvent, evaporates rapidly so that the viscosity of the formulation is effectively that of the polymerizable monomer. With the described formulation, only a fraction of a minute is needed for curing by ultraviolet exposure. The curing time is not critical as the curing is rapid and there is little tendency for overcuring, although continued exposure to the described ultraviolet source would tend to cause degradation. The curing converts the film from material wet to touch, to dry material, and also insoluble in solvents, in view of the thermoset nature of the polymer produced. The Irgacure 184 curing agent used is a free radical polymerization initiator, hydroxycyclohexyl phenyl ketone. Other free radical or other curing agents can be substituted for it. The technology of forming and curing plastics is well known, and other monomer or polymer materials can be substituted for the urethane herein, and other initiators or cross linking agents for hydroxycyclohexyl phenyl ketone.

EXAMPLE 2

Four films were prepared in accordance with general procedure of Example 1, but with some variation in conditions. The light transmission of the films was measured at various viewing angles, and efficiency (i.e. the maximum slope of the percent transmission curve) and maximum transmission (i.e. percent of impinging light transmitted) were determined, with results as set forth in Table 1.

TABLE 1

| | Efficiency & Maximum Transmission | |
|---|---|---|
| Sample | Efficiency | Maximum Transmission (%) |
| 1 | 1.27 | 71 |
| 2 | 1.10 | 73 |
| 3 | 0.52 | 35 |

TABLE 1-continued

| | Efficiency & Maximum Transmission | |
|---|---|---|
| Sample | Efficiency | Maximum Transmission (%) |
| 4 | 0.36 | 59 |

Sample 1 had the highest efficiency, i.e. exhibited the fastest transition from maximum to minimum percent transmission with change in viewing angle. Sample 4 had the lowest efficiency, i.e. exhibited the slowest transition from maximum to minimum percent transmission with change in viewing angle.

Variations among these values is also seen in comparing samples 3 and 4, where sample 3 has a higher efficiency than 4, but a lower maximum percent transmission. Thus by choice of materials, the selected characteristic can be imparted.

EXAMPLE 3

Several different particle sizes and shapes of $Fe_3O_4$ were used to prepare films, employing the procedure of Example 1. The films were evaluated for light transmission characteristics at angles from zero to 60° with results as reported in Table 2.

TABLE 2

| | Effect of Shape on Magnetite Properties | | | |
|---|---|---|---|---|
| | | | | Transmission (%) |
| Shape | Size (microns) | Hc (oersteds) | Efficiency | at 0° / at 60° |
| octahedral | 0.03–0.5 | 128 | 1.73 | 60 / 4 |
| spherical | 0.018 | 128 | 1.05 | 73 / 14 |
| octahedral | 0.225 | 115 | 1.75 | 60 / 4 |
| spherical | 0.225 | 115 | 0.84 | 74 / 33 |
| needle (*) | 0.9 | 128 | 0.79 | 54 / 13 |

(*) length = 0.9 microns; l/d = 10.

Similar performance, e.g. efficiency and transmission was indicated for louvered film made with the octahedrally shaped magnetite samples even with different particle sizes, particle size distribution and coercivity (Hc) in the range of 118–128 oersteds. The octahedrally shaped magnetite provided films of higher efficiency than the same size spherical particles. Of the two spherical materials, the smaller gave higher efficiency. The needle-shaped particles gave lower efficiency and lower maximum percent transmission than the films with octahedral or spherical particles. The particles used in the present invention will generally be submicronic in size, and can range down to small fractions of microns in size, such as 0.01 micron or lower, or about as low as available. Particles so small as to constitute single domain magnetic particles can be used. Larger particle sizes are useful, such as up to 25 microns or greater, provided that the sizes are less than the desired thickness or height of the agglomerate, and less than the thickness of the film matrix, and often preferably much smaller than such heights and thicknesses in order to permit good stacking of the particles without the agglomerates exceeding desired dimensions. The average maximum dimension of the particles will typically be less than 2 microns, such as 0.005 to 2 microns.

EXAMPLE 4

Coating formulations were prepared and applied to film substrates in accordance with the procedure of Example 1 but employing polymerizable material of various viscosities in order to evaluate the effect of the viscosity on particle alignment and light transmission. The light transmission efficiency factor at various viscosities is reported in Table 3.

TABLE 3

| Monomer | Viscosity (cps) | Efficiency | Temp (°C.) | Spindel | Speed (rpm) |
|---|---|---|---|---|---|
| Ebycryl 284 | 92,000 | 1.73 | — | — | — |
| Ebycryl 285 | 28,300 | 1.80 | 23.2 | 6 | — |
| DPEHPA | 15,960 | 0.49 | 23.2 | 6 | 50 |
| TTAE | 115 | 0.056 | 22.4 | 3 | 100 |
| TEGDMA | 37.2 | 0.069 | 23.2 | 2 | 100 |

It is apparent that the higher viscosities gave much better efficiencies. The viscosity effect is further illustrated in FIG. 3 which is a graph of transmission curves vs viewing angle. Photomicrographs of the films (100 magnification), as illustrated in FIGS. 4, 5, 6, 7, and 8, revealed the effects of viscosity on louver formation. The high viscosity matrices, FIGS. 4 and 5, had well shaped louvers, while the low viscosity matrices had uneven and distorted louvers.

In Table 3 Ebycryl 284 designates acrylated aliphatic urethane resin at 88% polymer solids in 1,6—hexanediol diacrylate, of about 98,000 centipoises viscosity, DPEHPA is dipentaerythritol hydroxy pentacrylate, TTAE is a trifunctional triacrylateester made available from ARCO as, Sartomer C-9012 and TEGDMA is triethyleneglycol dimethacrylate. The table includes the temperature, Brookfield viscometer spindle and speeds used in the viscosity determination. The different spindles are generally used for different viscosity ranges. There are usually large differences in viscosity with small changes in temperature, and the temperature of the viscous film during the alignment treatment should be taken into consideration in selecting prepolymers of appropriate viscosity. The viscosities in this application have general reference to usual room temperature or slightly below, such as about 23° C.

It appears that viscosity is important in retarding or preventing movement of the particles in the absence of the magnetic field, but permitting movement due to the field. While it is not intended to limit the invention in accordance with any theory, it appears that particular viscosity ranges promote good louver formation by tending to counteract gravitational or other forces which might cause undesirable agglomeration or randomization of the magnetic particles. Viscosities in ranges as low as about 38 cps up to 150,000 cps or more can be used, although ranges above 10,000 cps will generally be preferred, such as about 15,000 to about 100,000 cps or so, or possibly higher, with those above about 20,000 cps being especially preferred. Viscosities can be selected to give efficiencies above about 0.5, or still better, above about 1. Optimum viscosities may vary somewhat with strength of the magnetic field and response time, and particular particles used.

EXAMPLE 5

Figure 9:
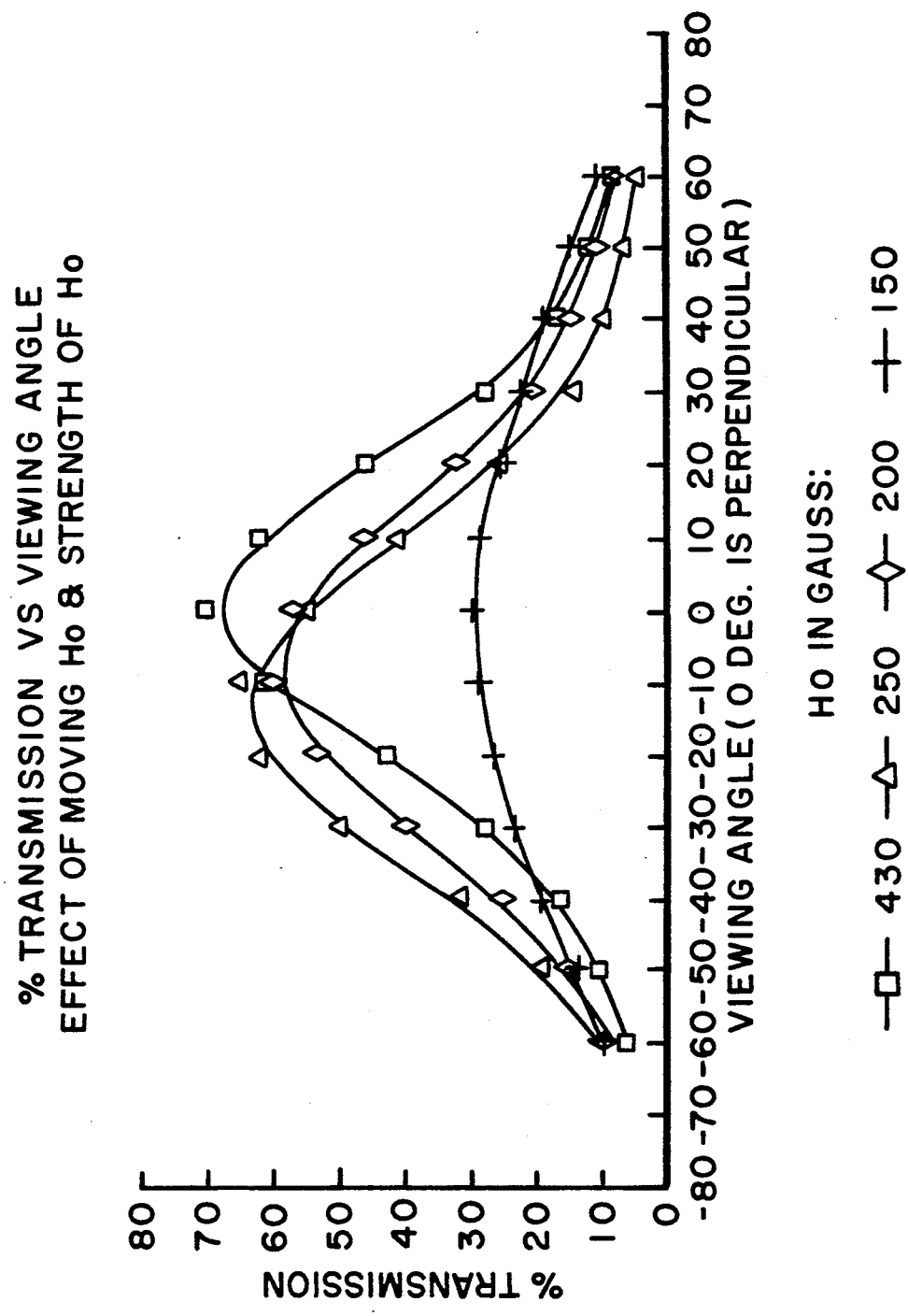
Figure 10:
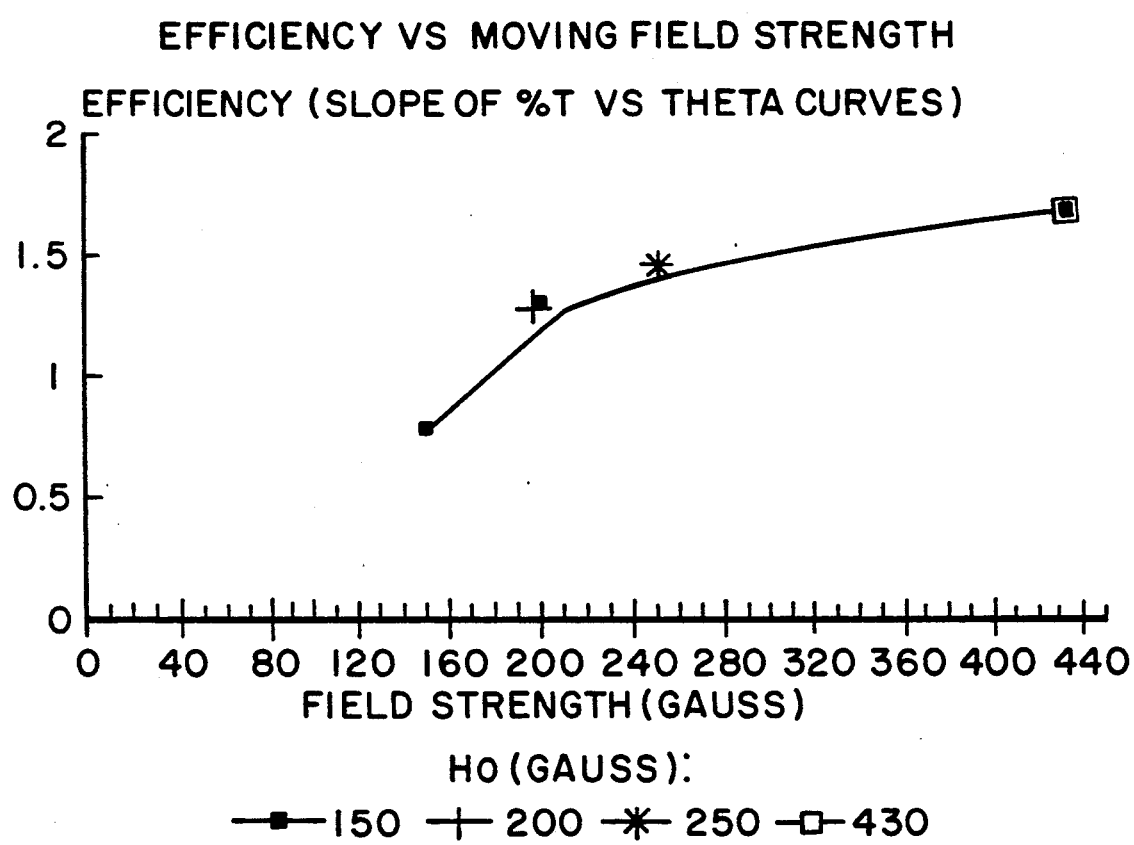
FIG. 10 is a graph of efficiency (as defined herein) of films as a function of field strength.

Film formulations made with Ebycryl 285 urethane acrylate polymerizable resin and a concentration of $Fe_3O_4$ were prepared in accordance with the procedure of Example 1 to obtain films having 0.1 gram/cc of $Fe_3O_4$. The films were exposed to magnetic fields at various strengths, with effects on light transmission as illustrated in FIG. 9. The film was carried over an 8.9 cm magnet at a rate of 468.5 cm/minute, for an exposure of 3.79 minutes, at field strengths varying from 430 gauss to 150 gauss. As seen in FIG. 9, fields of 200 to 430 gauss, gave angular transmission curves with high maximum transmission and good slopes, while the curve from 150 gauss had a low maximum transmission value and a low slope. The efficiency (slope of percent transmission vs theta curves) was plotted against field strength, with results as shown in FIG. 10. It can be seen that the performance of the films improved with increasing field strength.

The efficiency of the films of this Example, which had been produced at various field strengths and exposure times, is set forth in Table 4.

TABLE 4

Efficiency of $Fe_3O_4$ Louver Films

| Field (gauss) | Exposure Time (min.) | | | | |
|---|---|---|---|---|---|
| | 1.1 | 1.4 | 1.9 | 3.8 | 20.2 |
| 430 | 1.29 | — | 1.22 | 1.89 | 1.77 |
| 250 | — | 1.29 | — | 1.40 | 1.44 |
| 150 | — | — | — | 0.36 | 0.36 |

The 430 gauss results were generally better than those from lower field strengths, even when relatively long exposures were used. At all of the field strengths utilized, there appears to be an approach to maximum efficiency within a realistic time period. As the field strength decreased in the illustrated ranges, the maximum efficiency also decreased. With a 150 gauss field it has also been found that the percent of maximum transmission improves with increasing exposure time. While results will vary considerably with matrix material and viscosity, and the particle material, in general it will be preferred to use field strengths greater than 150 gauss in the present invention. Higher field strengths can be used such as over 250 gauss, up to 600 or 1000 or even 4000 or more gauss, with some possible improvement in results, or lowering of optimum exposure times. In the event a saturation gauss is obtained, additional field strength produces little change and has no advantage.

Figure 12:
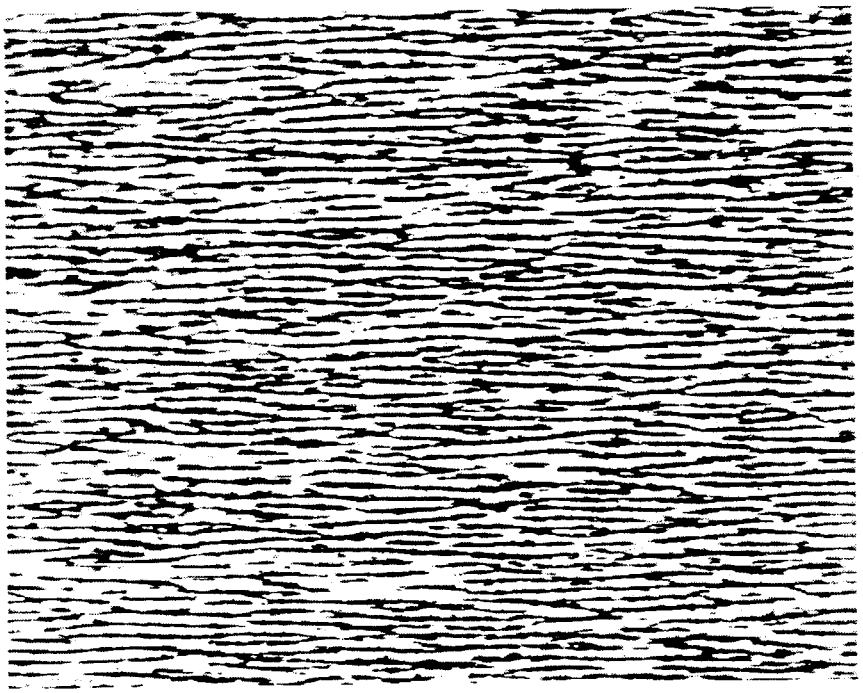
Figure 11:
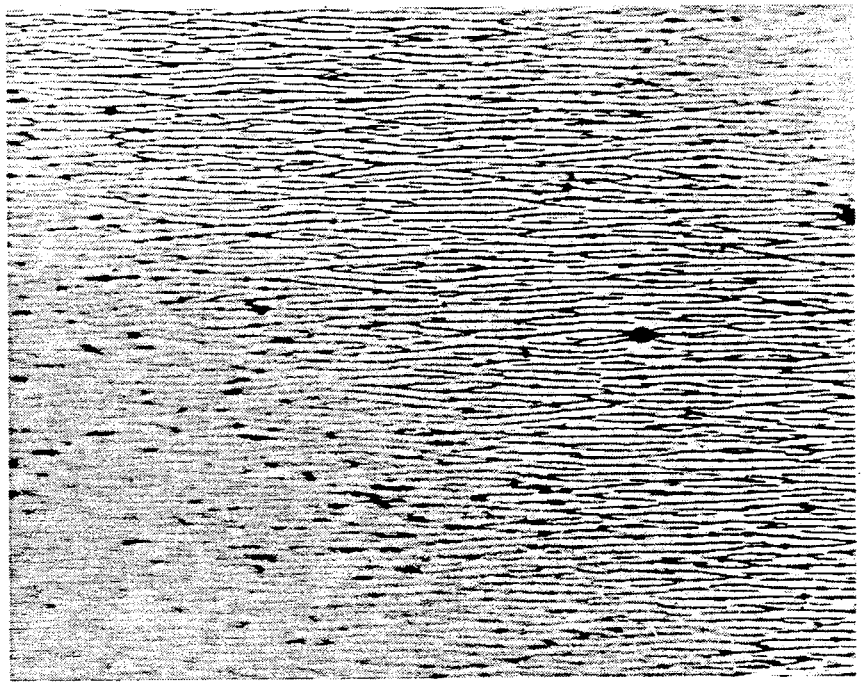
Figure 14:
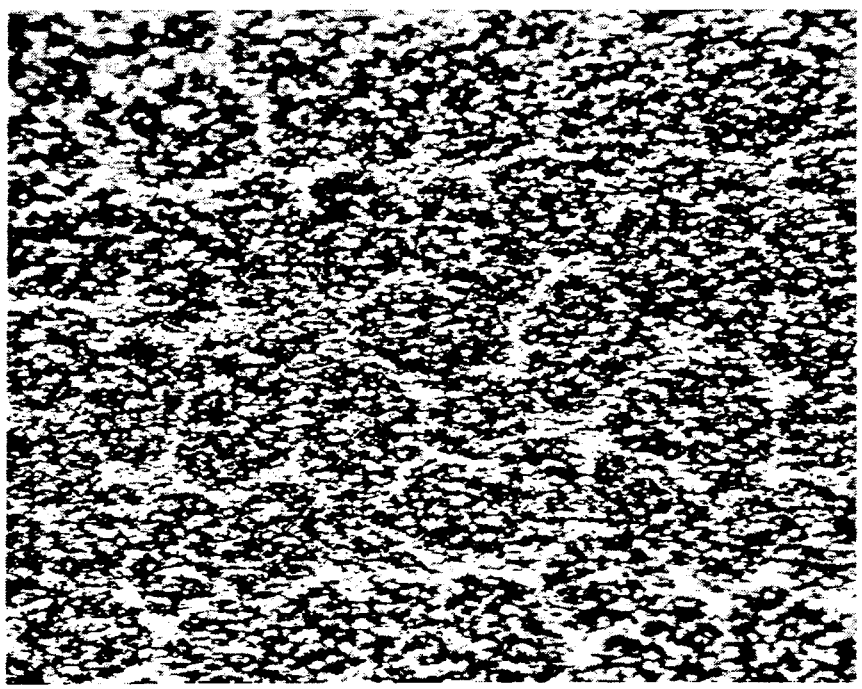
Figure 13:
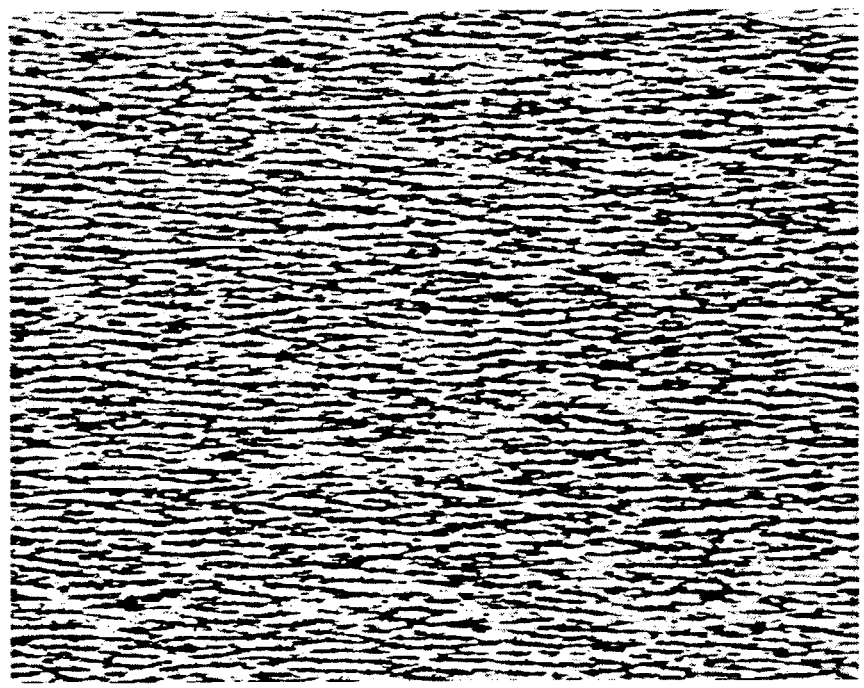

An interesting aspect noted in results with film prepared with 250 gauss or lower field strengths, was a tendency for the films to have their maximum percent transmission values off of perpendicular, i.e. at values other that 0 degrees. In the upper ranges of the field strengths used, the spacing between louvers seem to increase with a decline in the strength of the moving field employed, as illustrated by comparison of photomicrographs (100×) for 430 and 250 gauss, see FIGS. 11 and 12. At lower fields the trend appeared to reverse, giving narrower spaces, see 200 and 150 gauss photomicrographs (100×), in FIGS. 13 and 14. Actually evidence of louver formation in the 150 gauss photo is tenuous and its light control properties are only marginally better than those from a film with random magnetite distribution, which has not been exposed to a magnetic field. The louver count in the photomicrographs showing 30 mil (762 micron) views varied from about 90 at 430 gauss to about 60 at 250 and 200 gauss.

In some applications it will be desirable to have a gradient in the film due to gradual diminishing of the formation of louvers, as in automobile windshields or windows. Such a gradient can be achieved by varying the strength of the magnetic field to which different portions of the film are exposed, as by gradually lessening the exposure at or approaching one or both edges of the moving film. This can be done by employing electromagnets with different force zones.

In the present process employing a magnetic field to form louvers, the particles utilized are capable of alignment by a magnetic field. In general the alignment characteristics of particular particles can be determined by using the particles in carrying out film preparation procedures as described herein, and observing the degree of alignment and measuring light transmission. The tendency to align is related to coercivity as well as to remnant magnetization. Since these two characteristics are directly proportional, the effects on alignment will be similar. A homologous series of $Fe_3O_4$ and gama-$Fe_2O_3$ containing various amounts of cobalt was prepared by homogeneous solution techniques (for example, 50% aqueous NaOH). Samples were prepared with coercivity (Hc) from 115 to 515 oersteds. The particles were 180 angstrom diameter spheres, containing specified amounts of cobalt from 0 to 5% of iron on a mole basis, as set forth in Tables 5 and 6.

TABLE 5

Room Temperatures Magnetic Parameters for $Co_xFe_{3-x}O_4$ 180 A Spheres
(Powder in epoxy matrix measured to 10 K oe)

| Co (mole/mole Fe) | saturation magnetization (emu/g) | remnant magnetization (emu/g) | coercivity (oersteds) |
|---|---|---|---|
| 0.00 | 71.9 | 11.5 | 128 |
| 0.01 | 67.7 | 11.9 | 203 |
| 0.03 | 79.0 | 22.7 | 408 |
| 0.05 | 63.6 | 24.7 | 515 |

TABLE 6

Calculated Room Temperature Magnetic Parameters for $Co_x$ gamma-$Fe_{2-x}O_3$ 180 A Spheres

| Co (mole/mole Fe) | saturation magnetization (emu/g) | remnant magnetization (emu/g) | coercivity (oersteds) |
|---|---|---|---|
| 0.00 | 52.5 | 8.4 | 115 |
| 0.01 | 49.5 | 8.7 | 183 |
| 0.03 | 57.8 | 16.6 | 367 |

The gamma-$Fe_2O_3$ materials containing Co were made from $Co_xFe_{3-x}O_4$ by air oxidation at 200° C. for 2 hours. Their coercivity were approximated to be 0.9 of their magnetite source, an empirical determination based on the ratio of their saturation magnetization values obtained for similar size well crystallized $Fe_3O_4$ and gamma $Fe_2O_3$.

EXAMPLE 6

Figure 15:
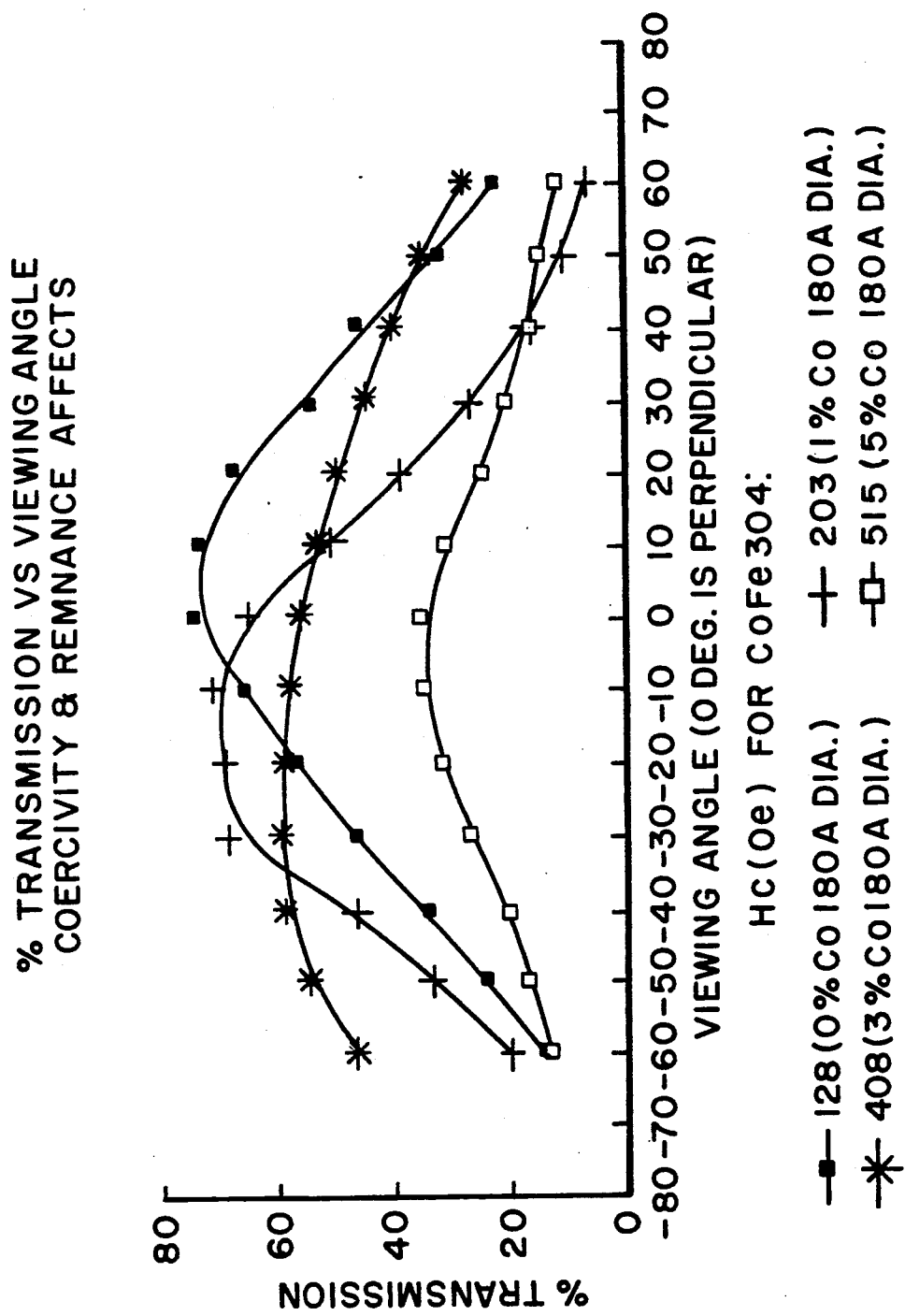

The performance of the louver films, prepared by the procedure of Example 5, containing 180 angstrom diameter $Co_xFe_{3-x}O_4$ was related to coercivity, as illustrated in FIG. 15. Efficiency of films was higher for samples having lower coercivity values, as shown in Table 7.

TABLE 7

$CoFe_3O_4$ (180 A sphere) Louver Film Values

| Co (mole/mole Fe) | Coercivity (oersteds) | max % T | efficiency (slope) |
|---|---|---|---|
| 0.00 | 128 | 73 | 1.10 |
| 0.01 | 203 | 64 | 1.27 |
| 0.03 | 408 | 59 | 0.30 |
| 0.05 | 515 | 34 | 0.52 |

Photomicrographs of the louver films made with spherical $Co_xFe_{3-x}O_4$ (with Hc=128, 203, 408 and 515 oersteds) showed that the materials with lower coercivity formed more uniform louver structures. The appearance of the louvers corresponded to the performance of the films illustrated in FIG. 15. The coercivity exhibited less of an effect in the oxidized derivatives, gamma-$Fe_2O_3$, than in the Co magnetite series. The gamma-$Fe_2O_3$ films, prepared by the procedure of Example 5, did not show very significant efficiency differences over the coercivity range of 115 to 367 oersteds, and their maximum percent transmission values were also close as seen in Table 8.

TABLE 8

Co gama-$Fe_2O_3$ (180 A dia.) Louver Film Values

| Co (mole/mole Fe) | Coercivity (oersteds) | max % T | efficiency (slope) |
|---|---|---|---|
| 0.00 | 115 | 76 | 0.83 |
| 0.01 | 183 | 74 | 0.85 |
| 0.03 | 367 | 70 | 0.89 |

While coercivity values of useful materials can very widely, with lower coercivity generally being better, the alignable materials employed will typically have coercivity values in range of about 100 to about 500 oersteds.

EXAMPLE 7

Figure 16:
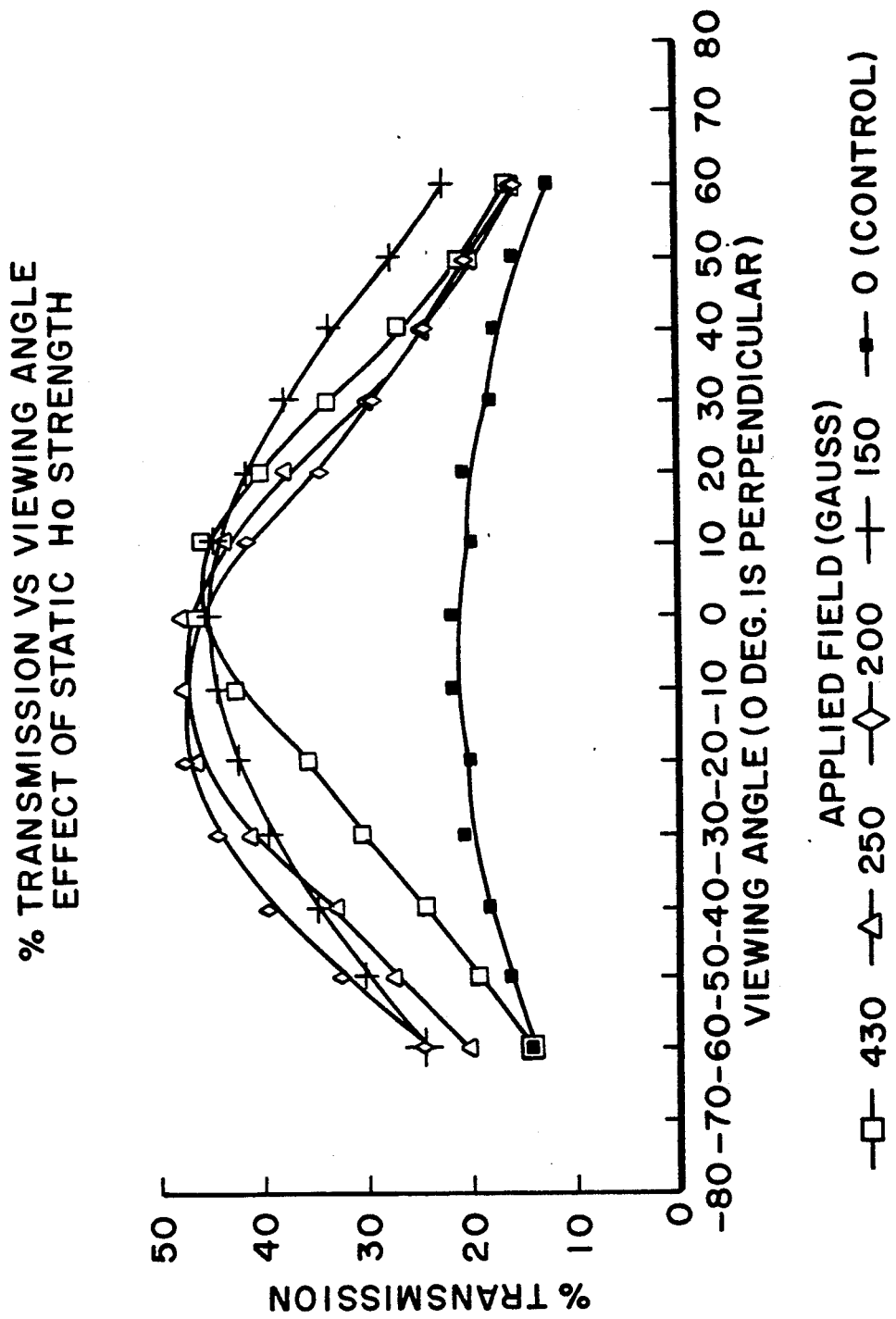

Films were prepared using an Ebycryl 285 urethane acrylate prepolymer matrix and octahedral $Fe_3O_4$ particles at 0.1 gm/cc of film according to Example 1. The films were subjected to a static magnetic exposure by being laid over the face of a magnet for 5 minutes at strengths from 0 to 430 gauss. The transmission vs viewing angle curves are illustrated in FIG. 16. The curves show selective transmission in accordance with viewing angle, as typical of a louver film, although maximum transmissions were less than 50%. The efficiencies for the static field films were typically lower than that for comparable moving field films, e.g. an efficiency of 0.69 at a 430 gauss static treatment, compared to 1.89 for a 430 gauss moving field treatment.

The loading level of the particles in the matrix has a marked effect on the quality of louver formation and the ability to control angular light transmission. Toward the low end of suitable ranges, the louver formation tends to be incomplete, while at the upper end, excessive irregular accumulations may tend to reduce the maximum light transmission attainable.

As indicated by the control sample in FIG. 16, the concentration of particles used in the present invention may permit some light transmission when present with no attempt to align, i.e. in a random distribution. Typical transmissions permitted by some of the preferred concentrations are typically in the range of about 10% to 20% or higher for light perpendicular to the film surface. Even after the particles are aligned, there will generally be some extraneous particles in the spaces between the louvers. Also, the louver formation generally has some irregularities, such as an incomplete louver being closely adjacent to another louver, rather than separated by the average distance between louvers, and part of a louver being slightly offset in position, although parallel to, the rest of a louver. Also, depending partially on particle concentration, the louver may be of less height than the film thickness, and parts of some louvers may not reach both film surfaces.

In the agglomerates in the present invention, the particles are not only present in relatively high concentration in particular regions of the matrix, but to a substantial extent particles are touching adjacent particles and may to some extent be bonded together by physical or chemical bonds. However, the invention is not dependent upon or to be considered limited by my theory of the status of the particles in the agglomerates.

In prior art procedures involving skiving to form a polymeric web with opaque louvers to provide a restricted optical aperture, it has been reported that skiving leads to irregularities in the web, necessitating polishing in efforts to obtain a smooth surface. In the present invention employing usual film forming techniques, films with smooth surfaces free of irregularities, and suitable for optical or other radiation transmission, are readily obtained. The films prepared in accordance with the present invention are generally characterized by uniform thickness.

It appears that films of the present invention are suited to providing a view of display terminals which is free from significant interference by moire lines.

It was observed that a film prepared in accordance with the present invention exhibited barely discernible or negligible moire lines when moved in front of a cathode ray tube display terminal. This was in contrast to the very pronounced moire lines observed upon similar treatment of a louvered film available from Minnesota Mining and Manufacturing, and presumably prepared by a skiving procedure. It may be that the irregular or rough nature of the louvers in films of the present invention, or the relatively short distances between louvers, contribute to a lack of significant moire interference.

EXAMPLE 8

A number of films were formulated, exposed to a magnetic field and cured in accordance with the procedure of Example 1, but employing $Fe_3O_4$ particles at various concentrations, and with several different film thicknesses. Light transmission was measured at perpendicular and 45° angles, with results as reported in Table 9.

TABLE 9

Percent Transmission Based on Pigment Concentration and Film Thickness

| Sample | $Fe_3O_4$ conc. g/cc | Film Thickness mils | Transmission (%) 0° | 45° |
|---|---|---|---|---|
| 1 | 0.01 | 2.0 | 89.5 | 76.2 |
| 2 | 0.02 | 2.0 | 83 | 52.2 |
| 3 | 0.10 | 2.0 | 64 | 0.6 |
|   | 0.10 | 1.45 | 59 | 2.7 |
|   | 0.10 | 1.0 | 61.5 | 5.4 |
| 4 | 0.50 | 1.6 | 1.95 | 0 |
|   | 0.50 | 0.6 | 15 | 0 |
| 5 | 0.6 | 1.0 | 0.80 | 0 |
|   | 0.6 | 0.5 | 12 | 0 |

It can be seen that with the materials employed in these formulations, concentrations of magnetite around 0.5 to 0.6 gram/cc tended to cut the light transmission more than desirable for many applications, but that this effect can be countered to a considerable extent by employing thinner films. In addition, this factor can be readily adjusted by employing concentrations needed to obtain desired light transmission with particular films, e.g. over 70% transmitted at the maximum transmission angle. With preferred or higher concentrations for particular film thicknesses, the height of the louver may approximate the film thickness.

EXAMPLE 9

Figure 17:
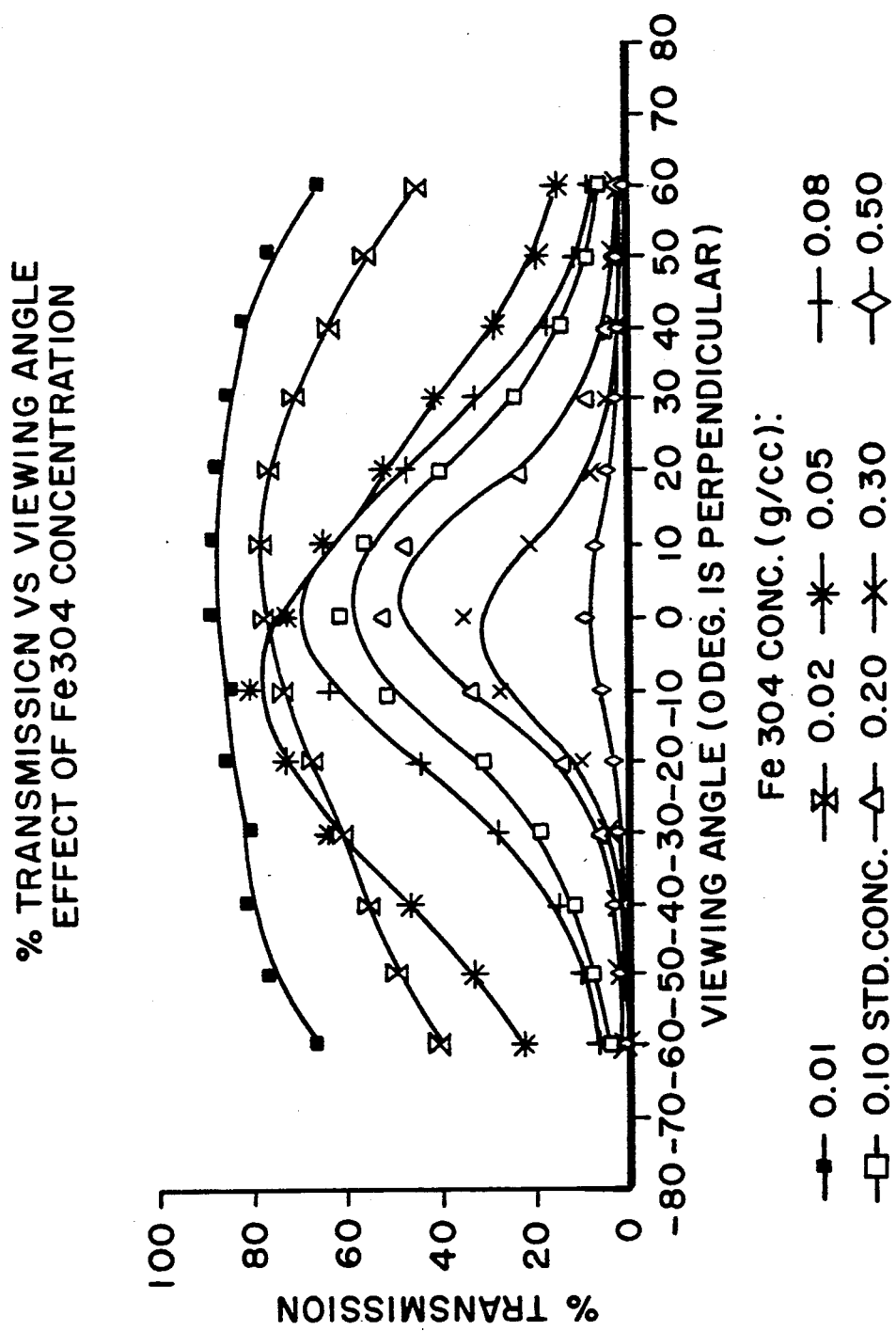
Figure 18:
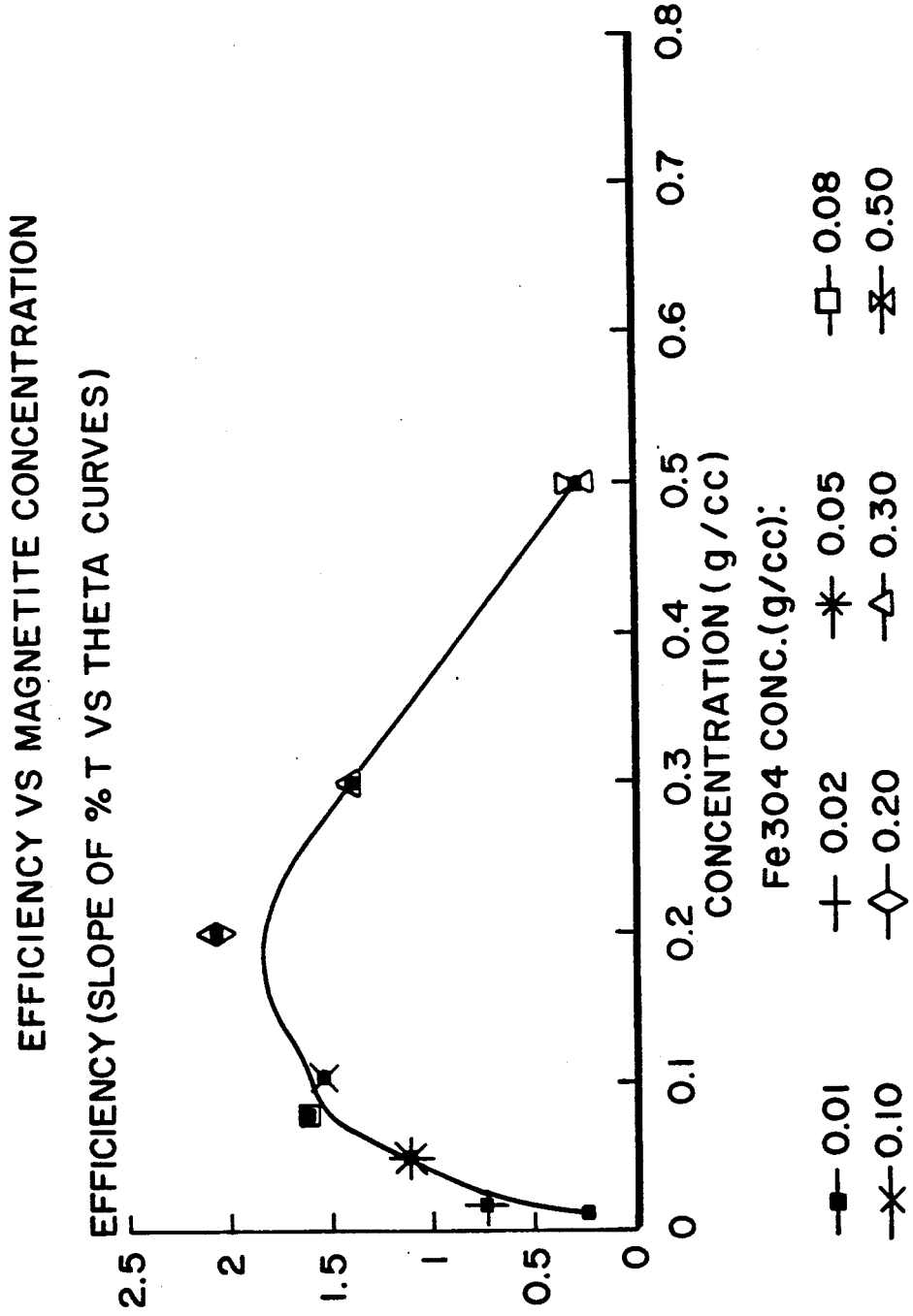
FIG. 18 is a graph of efficiency of films with various magnetite concentrations.
Figure 20:
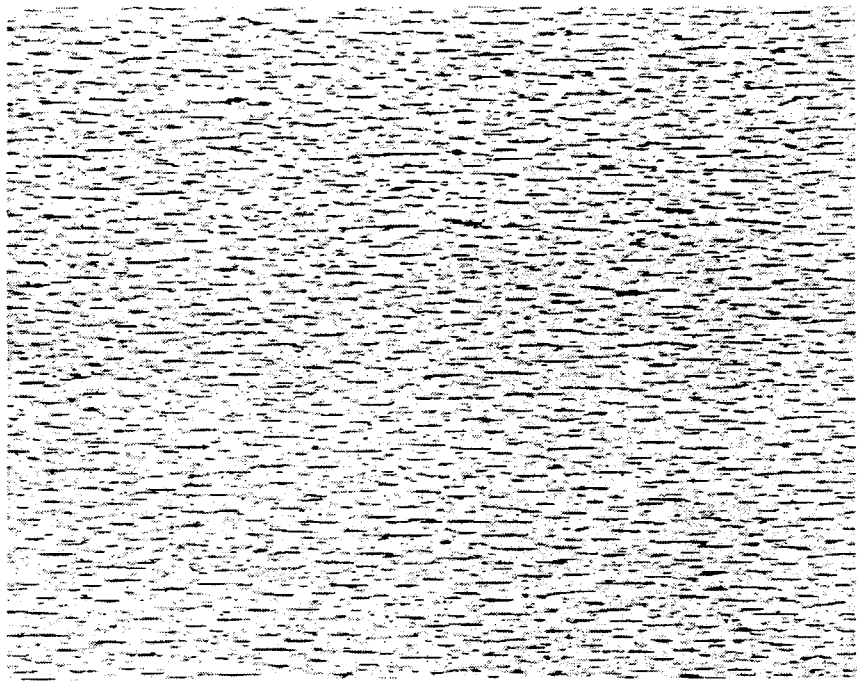
Figure 19:
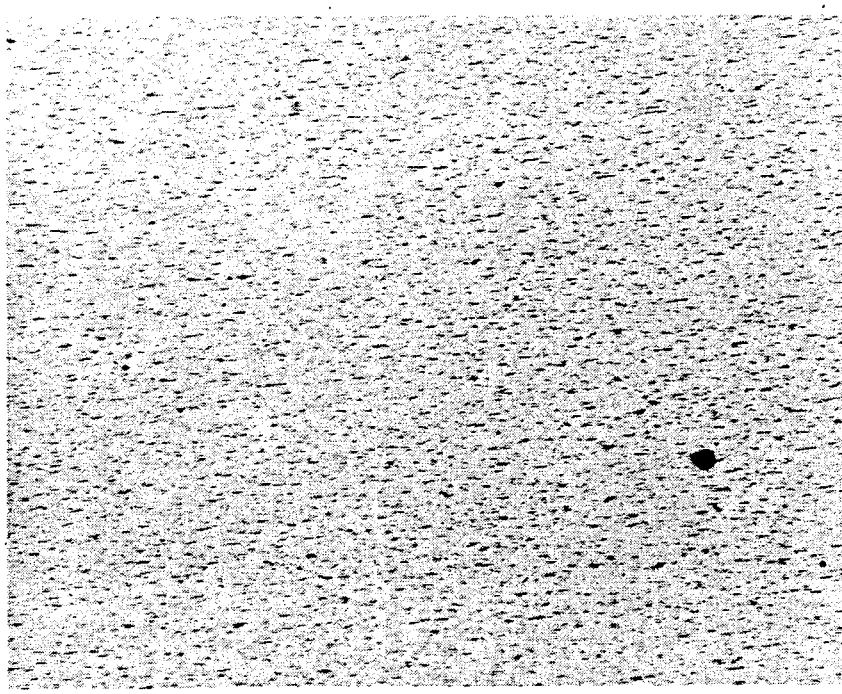
Figure 22:
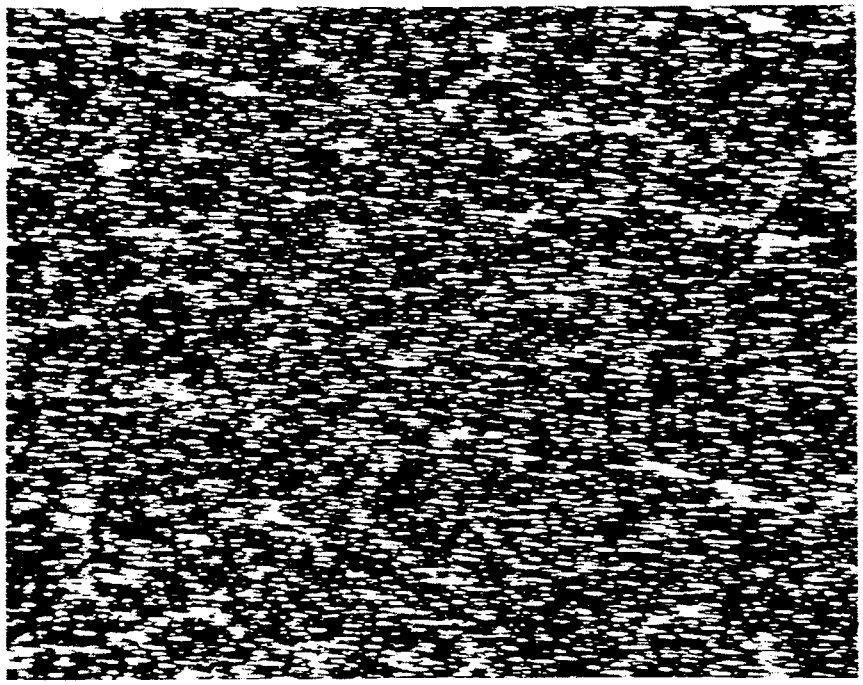
Figure 21:
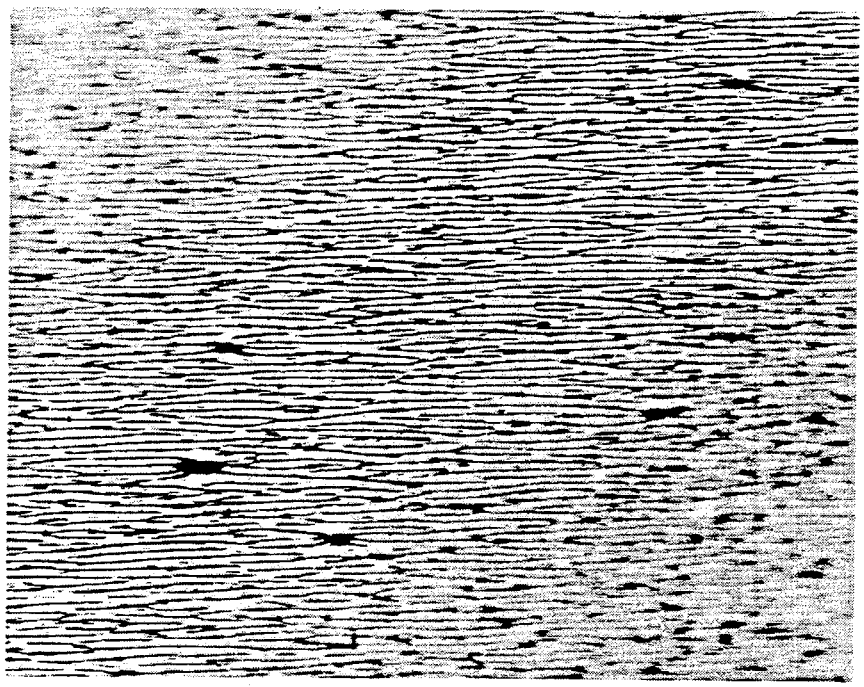

For a series of films with different $Fe_3O_4$ hexagonal particle concentrations, the percent transmission vs viewing angle curves are shown in FIG. 17 for films prepared and treated as in Example 1, but with varying Fe$_3$O$_4$ concentrations. All of the curves demonstrate some angular control, but better performance is shown in those from 0.05 to 0.20 gram/cc. The efficiency (maximum slope) vs concentration is plotted in FIG. 18. While the maximum efficiency was at about 0.2 gram/cc, a very good balance between maximum transmission (see FIG. 17) and efficiency was at about 0.1 gram/cc. Photomicrographs of films were obtained at concentrations of 0.01, 0.02, 0.10, and 0.50 gram/cc, as shown in FIGS. 19, 20, 21, and 22. At 0.1 gram/cc, the louvers appear well formed and uniform, thus correlating well with the good light transmission performance. At the concentrations below 0.1 gram/cc, the louvers appear less complete while at the 0.5 gram/cc concentration, there appears to be crowding with considerable accumulation outside of regularly spaced louvers. Thus for many applications it will be desirable to employ particles in concentrations in the range of about 0.01 to about 0.6 gram/cc of matrix film, with a preference generally for ranges of about 0.05 to about 0.25 grams/cc.

Converting these ranges to a volume basis to make allowance for employing materials of density different from that of magnetite (5.2 grams/cc), the ranges of particulate are approximately 0.2 to 11.5% by volume of the matrix materials, with a preference generally of approximately 1% to 5% by volume of the matrix material.

EXAMPLE 10

Films were prepared with iron particles employing different field strengths and exposures. At a 0.1 g/cc film loading, applied fields varying from 30 to 430 gauss, and exposures at 3.8 minutes or 20.2 minutes, produced little difference in light transmission performance. At a higher concentration (0.4 g/cc) the maximum percent transmission was increased from 62% to 70% by increasing the exposure time to 20.2 minutes while the efficiency remained at 0.68. Microscopic examination of the iron powder-filled films indicated fairly good louver formation. However, a difference from the magnetite-filled films was the greater louver spacing with iron, having, for example, 10 louvers to a 30 mil (762 microns) view for a 430 gauss field compared to about 90, for example, for magnetite. The number of lines per unit length declined with increase in field strength, declining approximately linearly from near 29/mm at 150 gauss to near 13/mm at 430 gauss. Louver thickness was generally in the range of about 5.7 to 12.5 microns. With some variation, due to louver thickness, the louvers per unit width of film provides an indication of spacing between louvers. The greater spacing apparently permits greater light transmission with less opportunity for selective filtration by the louvers. By increasing the film thickness and therefore the height of the louvers, it will be possible to increase the filtration capabilities of the film. An additional factor is that iron has a higher density, about 7.8, than magnetite so that a given weight of iron occupies less volume.

EXAMPLE 11

Within fairly short and practical time frames there is a direct relationship between the time a film resides in a moving magnetic field, and its performance. Exposures of magnetite-containing films prepared and treated in accordance with Example 1, in a 450 gauss field but for times varying from 0.019 minutes to 20.2 minutes, produced films providing a family of performance curves with increasing maximum percent transmission values, with most of the increase coming with exposure times up to about 0.76 minutes. Also the efficiency approximated maximum value at about 0.76 minute and showed little further improvement even by 20.2 minutes. The results suggest that the louvers are well formed early in the aligning procedure, but that the spaces between the louvers still contain stray particles which take more time to be moved into place. The results indicate that fairly good light transmission performance can be obtained with fairly short field exposures, such as a fraction of a minute or so. The data also indicates that the maximum transmission gradually improves with time, and, for example, could be increased to 80% with an exposure of 33.3 minutes. Some of the various time exposure curves are illustrated in FIG. 23. As a matter of additional interest, FIG. 23 also has one curve at a 3.795 minute exposure, which resulted from viewing in a direction parallel to the louvers, rather than perpendicular to the louvers. It can be seen that the light transmission is relatively high throughout the viewing range and the curve is fairly flat, as to be expected with much light going parallel between the louvers with little intersection. The difference between this curve and those in a perpendicular direction to the louvers, illustrates the anisotropic nature of the louvered film.

EXAMPLE 12

A number of magnetite samples, of particle size 0.02 to 0.95 micron, as determined by electron microscopy, were ground for various times, from zero to 180 minutes, in a shaker mill. Electron photomicrographs did not reveal any clear differences in particle size. However, photomicrographs of louvered film prepared with the samples in accordance with Example 5 at 450 gauss and 3.8 minute exposure, indicated that the number and size of agglomerates decreased with increases in grinding time. Even with this apparent difference, the grinding time seemed to have minimal effect on louvered film performance. The transmission vs viewing angle curves were of typical shape with maximum near 75 and very small differences in the curves.

EXAMPLE 13

A limited number of metal compounds which were not in the ferromagnetic class were employed in procedures to determine louver formation under magnetic field conditions comparable to Example 1, at 450 gauss and 3.8 minute exposure. The materials employed included FeO (Wustite, black), FeNaO$_2$, Fe$_2$O$_3$ (red), FeCl$_2$, and alpha-FeO(OH) (Goerthite, yellow), as well as a sample of a ferrimagnetic material, Fe$_3$O$_4$ (2250 angstrom, octagonal). Films prepared with these materials under the magnetic field conditions were found to perform about the same as films which had not been exposed to magnetic fields, excepting only the Fe$_3$O$_4$ which performed well. Similarly films prepared with nickel acetate, nickel ferrite and Holmium oxide did not appear to form louvers. It may be that some of these materials can be aligned under more stringent conditions.

EXAMPLE 14

Figure 24:
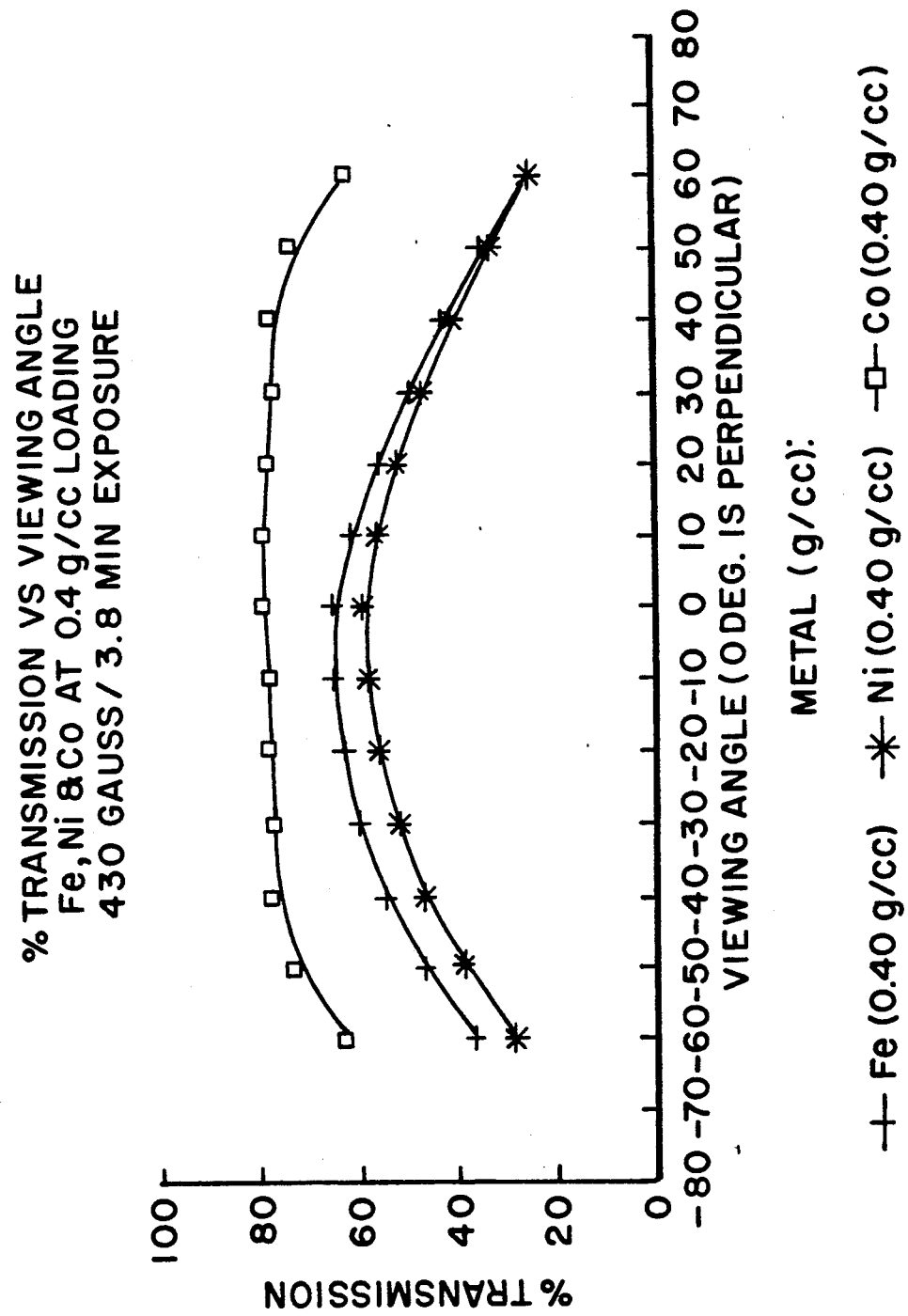

Films were prepared employing iron, nickel, cobalt and gadolinium as the metal particle in accordance with the procedure of Example 1, with a moving field exposure of 150 to 430 gauss for 20.2 minutes. Good alignment was obtained, as shown by examination of microstructures. The light transmission performance of the films was found to vary considerably with the metal loading. The performance of iron, nickel and cobalt at 0.4 grams/cc loading, and with exposure at 430 gauss for 3.8 minutes, is shown in FIG. 24. However, the performance at 0.1 gram/cc of iron, nickel, cobalt and gadolinium was of very poor quality. Iron, nickel, cobalt and gadolinium are examples of alignable metal materials which can be employed in the metal state in the invention. Other materials which are alignable include ferrites such as $Fe_3O_4$ and other $M_xFe_3O_4$ and $M_x$ gamma $Fe_{2-x}O_3$ compounds where M represents a suitable metal such as cobalt. Other suitable compounds include $NaFeO_2$ and other alkali metal ferric oxides.

In general, ferro and ferrite materials are suitably alignable for use, including ferrimagnetic spinels, garnets and hexagonal and other structures as described in "The Physical Principles of Magnetism", by Allan H. Morrish, Krieger Pub. Co., Malabor, Fla. (1965), Chapter 9, which is incorporated herein by reference. Further description of ferromagnetic and ferrimagnetic materials is found in "Ferrohydrodynamics" by R. E. Rosenswieg, Cambridge University Press, (1985), particularly pages 4 through 7, which is incorporated herein by reference. Ferrites of the general formula $MO-Fe_2O_3$ exhibit ferrimagnetism where M stands for Fe, Ni, Mn, Cu and Mg. Magnetite, having composition $Fe_3O_4$, and possessing cubic crystalline structure, is the best known ferrite. Hexagonal ferrites and garnets, which are cubic insulators composed of iron, other metals, and oxygen atoms, give additional examples of ferrimagnetic materials. The ferro and ferri magnetic materials will be employed at temperatures where necessary or desirable magnetic properties are exhibited rather than above the Curie temperature where such properties disappear.

EXAMPLE 16

A film was prepared with exposure to a moving magnetic field as described herein in Example 1 using an Ebycryl 285 urethane acrylate prepolymer with 18,000–28,000 cps viscosity and exposure at 430 gauss for 3.8 minutes. However, following the exposure and removal from the immediate vicinity of the magnet face, the film was permitted to remain in an uncured state for a short time, no more than about 5 minutes, before curing with ultraviolet irradiation as in Example 1. The resulting film had $Fe_3O_4$ particle agglomerate louvers angled about 40° from perpendicular to the surface and a percent transmission vs viewing angle curve, FIG. 25, which differed radically from the usual zero degree louver film. Evaluation of the percent transmission vs theta and 360° degree rotation produced a film curve with one maximum and one minimum, in contrast to the films with louvers oriented at zero degrees, which produced two maximums and two minimums. The films with louvers oriented at angles can be illustrated as in FIGS. 26a and 26b. These figures show the positioning of louvers in a cross-sectional view in machine direction, i.e., the direction the film is moved through the magnetic field. In FIG. 26a, film was permitted to stand for time "n" following orientation by the magnetic field, prior to curing, and the louvers turned at a slight angle to the film surfaces. Consequently, the maximum light transmission angle would be at the angle of the louvers. In FIG. 26b, the film was permitted to stand for time "2n", and the louvers have turned to a steeper angle, and maximum transmission would occur at this degree angle. Thus the desired angle can be obtained by varying the standing time, to obtain louvers with angles from perpendicular (0°) to parallel (90°). The FIGS. 26a and 26b are illustrative and the actual change from doubling the time may be different from that illustrated. Also the louvers are illustrated by lines, but actually have appreciable thickness.

Another procedure for producing films with louvers angled to the film surface is to treat the particle-containing viscous film by exposure to a magnetic field in which the magnetic lines of force are at an angle to the film surface. Thus if the film is being moved horizontally through the field in a west-to-east direction, the magnetic field lines can be oriented at an angle other than vertically through the film, such as an angle between vertical and horizontal in the north direction transverse to the movement of the film, such as a 45° angle from vertical. The resulting louver will then be aligned in a direction generally parallel to the film movement but canted to the film surface at an angle generally corresponding to the orientation of the magnetic field lines, and can be fixed in such position by curing the film matrix with the louvers in such position. Magnets are available which provide magnetic lines of force at an angle to the face of the magnet, say its north pole, and such magnets can be used in the manner taught herein with the magnet face substantially parallel to the film surface in order to provide the desired angular lines of force. It is also feasible to turn a magnet so that its surface is at an angle to the surface of the film, with the angle being in a direction transverse to the direction of movement of the film. The turning of the magnet will place one edge of the magnet at a greater distance from the film than the opposite edge, thereby causing some distortion in the field strength present at different parts of the film, and possible non-uniformity of the louvers produced. However, this can be compensated for by using magnets both above and below the film, and turned at the same angle. Also in some cases it may be advantageous to have a gradient in the film due to gradual diminishing of the formation of the louvers, and angling the magnet could be used as a means to achieve this effect.

EXAMPLE 17

A urethane acrylate prepolymer film with loading of $Fe_3O_4$ as described in Example 1 was placed over a magnet and in a 430 gauss field for 5 minutes, and the film was then fixed by ultraviolet curing. The film gave a transmission vs viewing angle curve as shown in FIG. 27. While the maximum transmission was lower than that achievable with moving fields, and not much over 50%, and the efficiency only 0.60, the film would be suitable for particular applications. The minimum transmission was also higher than that usually found in that from films with well-formed louvers from exposure to moving fields. Moreover, the film appears to be characterized by columnar structures oriented to the surface of the film, rather than by louver structures parallel to the surface. The film was isotropic in that the distribution of the columns was such as to make it seem the same regardless of the direction of viewing, e.g., east-west or north-south. Thus, when sightings were taken as if the apex of a cone with surfaces 40° from vertical was placed against the surface of the film, and sightings taken around the base of the cone (360°) along the surface of the cone, the percent transmission remained essentially constant at around 30%, or approximately the percent transmission previously shown for a 50° angle (or −50°) in FIG. 27. On a theoretical basis, the columnar distribution, if hexagonal, could be expected to give light transmission oscillating through maxima and minima with changes in viewing direction, such as maxima at 0° (180°), 60°, and 120°, and minima at 30°, 90°, and 150°. The constant transmission observed is possibly due to inadequate film thickness or viewing angle, or from a random rather than hexagonal distribution of columns.

In contrast to the isotropic nature of the film produced in a static field, measurements taken on the louver films from moving magnetic fields, provided different results. Taking the same % angle transmission measurements in two directions on the films illustrated the anisotropic nature. Note FIG. 23 in which the curves taken from views in a direction perpendicular to the louvers exhibited effective light control at angles removed form zero, while the curve from parallel views let most of the light through with little interference with the transmission, even at angles far from zero (perpendicular). The deviation from the maximum transmission at greater angles may be due to the presence of randomly dispersed particles in the spaces between louvers, or the uneven slope of the louvers to create non-uniform spacings.

Figure 28:
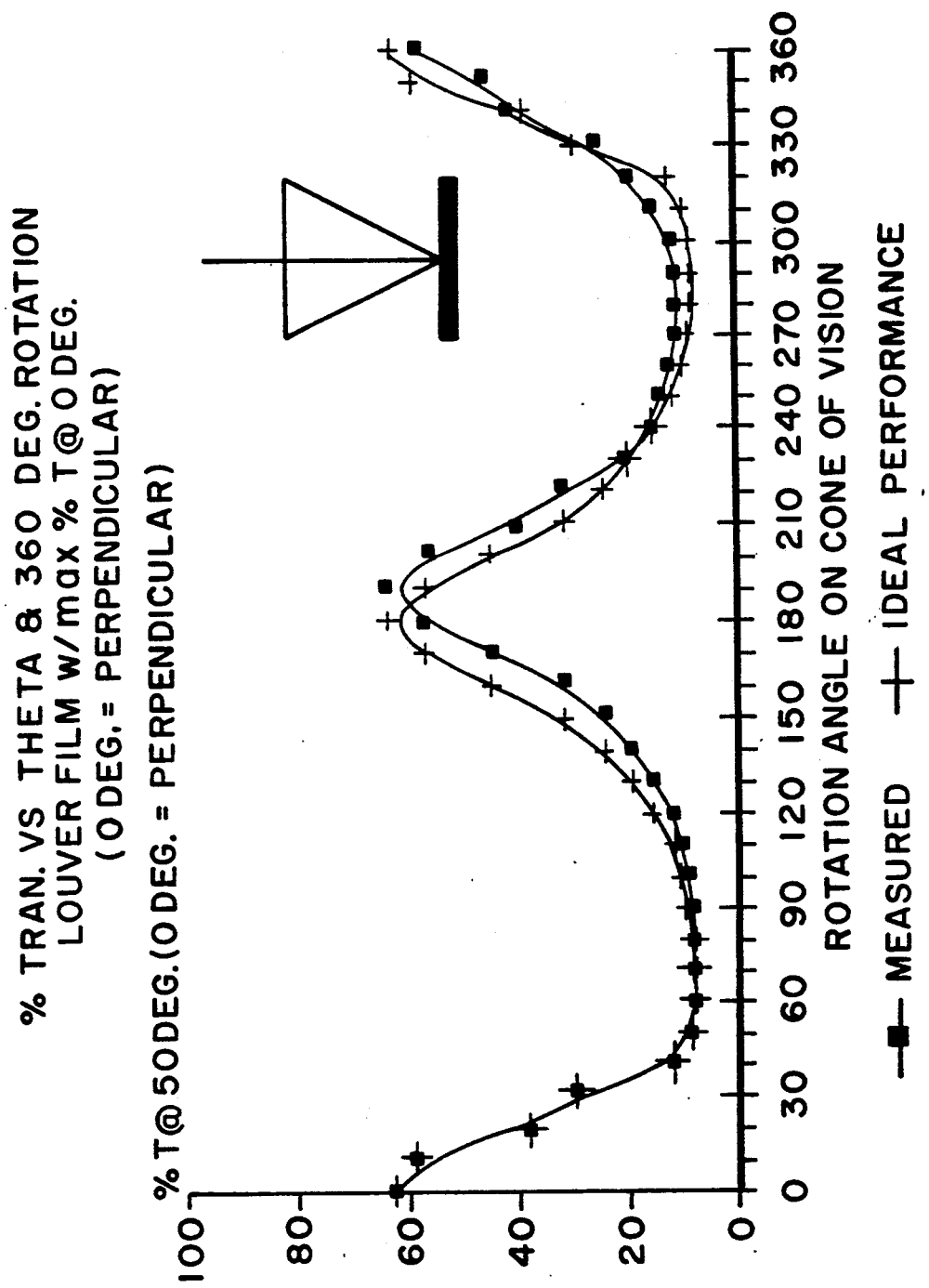
FIG. 28 is a graph showing variation in the percent of transmission at a particular incident angle, as the film is rotated through 360°.

The isotropic nature of a louvered film was further shown by measurements as if sighted on the surface of a cone (surface 50° from vertical) with apex on the surface of the film, at angles from zero to 360° around the base of the cone. Employing the film used in FIG. 23 for contrasting perpendicular and parallel views, two maximums and two minimums were obtained at 90° intervals, as shown in FIG. 28, as would be expected from closely spaced louvers in a film. This is in marked contrast to the nearly flat curve obtained for a film produced in a static field as described above.

It was observed from photomicrographs that a sample of the above films produced in static field had agglomerates in the form of columns oriented normal to the surfaces of the film. Measurements indicated the columns with considerable variation to be of the order of about 1 micron in thickness, and the spaces between agglomerates to be about 10 microns. The columns in height approximated the film thickness.

EXAMPLE 18

A plastic sheet as described in Example 1, was utilized to prepare a film with louvers in circular form. The sheet was positioned above a square magnet, 90 mm on a side, and the magnet was rotated about one corner placed in the center of the sheet at a rate of about 12 rpm for about 12 minutes. The sheet coating was then cured in the usual manner. The sheet was observed to have louvers forming a pattern of annular rings about the center of the sheet. The sheet appeared nearly transparent when viewed from a direction normal to its surface, and varied in degree of transparency when viewed at acute angles to the surface, with changes in direction between parallel and perpendicular to portions of the annular louvers. Rather than having the magnet rotate, as in this Example, a magnet can be moved on a circular path any desired distance from the center of a circle, thereby forming annular louvers in the path traced by the magnet. In addition, a magnet can be moved repeatedly on any desired path, thereby forming louvers in, and in the direction of, the path.

It is an advantage of the present invention that films can be produced with very narrow spacings between light control louvers, such as less than about 20 microns, and in the range of about 3 or 5 up to about 12.5 microns. The narrow spacing makes it possible to employ relatively thin films and still achieve good light control. Wider spacings can also be obtained, such as up to 20 microns or up to 50 microns or so, and good light control can still be obtained by increasing the height of the louvers, using somewhat thicker films and higher particulate concentrations as means, and often using louver heights equal to or greater than the spacings. Still greater spacings and louver heights can be used if desired but there is generally no advantage in such embodiments.

It is useful to employ materials alignable by magnetic means into agglomerates in preparing the films of the present invention. However, it is not necessary to have magnetically alignable materials in order to refract or reflect light, and other light absorbing or otherwise optically limiting materials can be used in the light control agglomerates in the films of the invention. Thus carbon black and various other pigments, dyes and opaque materials are capable of absorbing or refracting light and can be employed, with suitable particle sizes being generally in about the ranges described herein, as with mainly reference to magnetically alignable materials. One procedure for achieving formation of agglomerates of such other refractory materials is to employ them in conjunction with magnetically alignable materials. For example, plastic particles, e.g., polystyrene spheres, can have magnetic particles incorporated therein for alignment, and carbon black or other pigments for light refraction, or dyes to make the polystyrene colored or opaque. Polystyrene spheres of 3 micron size containing magnetite have been described by Skjeltorp, J. Appl. Phys. 57 (1), 15 Apr. 1985, pp. 3285–3288. Another possibility is to incorporate magnetite or other alignable metals into pigments, or to coat magnetite particles with pigments or opaque filler materials.

The light control materials of the present invention are useful in various applications involving control of light rays, particularly selective control in accord with the angle of the light rays. The control can involve the selection or the determination of direction or areas of application of light, or determination of the direction or areas of light rays visible to a viewer. Thus the light control films can be used to block substantially the direct rays of the sun striking a window from a high point in the sky, while permitting good transmission of other ambient light from outside the window. From the viewer's aspect, the window can, for example, permit the viewer inside the building to have a good view in a direction of a horizontal plane perpendicular to the window, but restricted visibility at angles above or below that plane. By overlaying horizontally louvered and vertically louvered films, it is possible to restrict vision in all but directions in lines perpendicular to a window.

Light control films with angled louvers will have interesting applications in windows of buildings. Thus in multi-story buildings, the downwardly angled louvers could be employed to reflect sun rays and to permit an occupant to view the ground below, but to block the view toward windows on the same level in an adjacent building. Similarly, in an automobile windshield, light at some angles can be moderated and the driver provided with a gradient view. In the case of light application, the films can be used to direct light to a particular work or reading location, while shading an adjacent rest location. Also the film can be used with video display terminals for security reasons to permit confidential viewing by an operator, while the view of a nearby observer is blocked. The film can also be employed to protect a video display screen to a considerable extent from ambient or other light sources, thereby enhancing the contrast of the display on the screen. In addition, various pigments or dyes can be used in the films, or portions thereof, to provide multi-color effects in conjunction with the light and dark effects provided by the louvers in accordance with viewing direction.

What is claimed is:

1. A film for controlling the transmission of radiation between surfaces thereof comprising a continuous, solid matrix and disposed in said matrix a set of linear, side-by-side louvers composed of agglomerates of particles of a magnetically-alignable material which differs in permeability relative to the matrix material with respect to at least some selected radiation, wherein said louvers are aligned at a essentially a common angle to the surface of said film and are randomly disposed between said surfaces at a spacing between said louvers of less than 50 microns; and wherein, when radiation impinges on one of said surfaces of said film, said radiation is transmitted through said film so that the angle of maximum transmission through said film is essentially parallel to said common angle of alignment of said louvers and the transmission of radiation is reduced at angles divergent from said common angle.

2. The film of claim 1 in which the particle material is relatively radiation limiting with respect to at least some selected radiation.

3. The film of claim 1 in which the matrix is an optically clear material and the particles are optically limiting material.

4. The film of claim 1 in which the louvers are less than 10 microns apart and of average height at least as great as the average distance between louvers.

5. The film of claim 2 in which the louvers are disposed at an angle of approximately 90° to the upper surface of the film so that a high proportion of radiation impinging perpendicularly upon the film can be transmitted between the louvers and through the film.

6. The film of claim 2 in which the louvers are disposed at an angle other than 90° to the surface of the film.

7. The film of claim 1 in which the louvers are about 5 to about 20 microns apart, and the film is no more than about 50 microns thick.

8. The film of claim 1 in which the particles are ferromagnetic or ferrimagnetic materials.

9. The film of claim 1 in which the particles are magnetite.

10. The film of claim 1 in which the particles are iron.

11. The film of claim 1 in which the matrix is selected from an organic polymer resin.

12. The film of claim 1 in which the matrix is selected from acrylic and urethane resins.

13. The film of claim 3 in which the particles are of sizes having a minimum dimension in the range of about 0.005 to 2 microns, and of concentration about 0.2% to about 11.5% by volume of the matrix material.

14. The film of claim 3 in which the concentration is about 1% to about 5% by volume.

15. A process of preparing radiation control materials which comprises subjecting a viscous, film matrix material containing a small concentration of magnetically alignable particles, to a magnetic field to align the particles into agglomerates in the shape of walls of appreciable thickness and curing the matrix material to fix the agglomerates, wherein the film is subjected to relative movement with respect to magnetic fields to align the particles into agglomerates in louver shape.

16. The process of claim 15 in which the film is subjected to a static magnetic field to form generally cylindrical shaped agglomerates oriented to the magnetic field and substantially normal to the film surface.

17. The process of claim 15 in which the viscous film material has a viscosity in the range of about 15,000 to about 150,000 cps.

18. The process of claim 15 in which the viscosity is at least 10,000 cps.

19. The process of claim 15 in which the viscous film is subjected to a magnetic field in the range of 150 to 4000 gauss.

20. The process of claim 15 in which the concentration of alignable particles is in the range of about 0.2% to about 11.5% by volume of the matrix material.

21. The process of claim 15 in which the concentration of alignable particles is in the range of 1% to 5% by volume of the matrix material.

22. The process of claim 15 in which the viscous film material is passed through a magnetic field a number of times, thereby obtaining sufficient total field exposure.

23. The process of claim 15 in which the viscous film material is moved through the magnetic field at a rate between about 1.5 and 9.7 meters/minute.

24. The process of claim 15 in which the total field exposure is more than 12 seconds.

25. The process of claim 15 in which the particles are of size in the range of 0.005 to 2 microns.

26. The process of claim 15 in which the average particle size is less than 1 micron.

27. The process of claim 15 in which the particles are selected from ferrimagnetic and ferromagnetic materials.

28. The process of claim 15 in which the matrix is an optically clear material.

29. The process of claim 15 in which the matrix material comprises a polymerizable monomer or oligomer.

30. The process of claim 15 in which the matrix is selected from acrylic and urethane materials.

31. A method of affecting the transmission of radiation by employing a film having a solid matrix permeable to at least some radiant energy rays and having disposed therein a set of agglomerates of radiation limiting particles, which individual agglomerates have on the average a minimum dimension no less than about 0.7 micron, and with distances between adjacent agglomerates being on the average at least about 3 microns, and controlling the direction from which radiant rays pass through the film, or the direction of rays emerging from the film, or both.

32. The method of claim 31 in which the agglomerates are disposed as louvers in side-by-side relationship.

33. The method of claim 31 in which the film is employed to selectively shield against some microwaves.

34. The method of claim 31 in which the particles are optically limiting and light rays are permitted to strike the film at a number of angles and there is greater transmission of light striking at some angles than that striking at other angles.

35. The method of claim 34 in which the film comprises a composite structure including a transparent glass layer.

36. The method of claim 35 in which the film is employed in a building window to favor transmission of external ambient light over direct sunlight.

37. The method of claim 34 in which the particles are magnetically alignable and selected from ferromagnetic and ferrimagnetic materials, and the solid matrix is an organic polymer.

38. A method of affecting the transmission of light which comprises permitting light rays to impinge upon a film which is composed of a light-transmitting solid monolithic matrix having disposed therein linear louvers in side-by-side relationship, which louvers are composed of agglomerates of aligned optically limiting particles, and in which the louvers are no more than about 75 microns apart.

39. The method of claim 38 in which the louvers are aligned at an angle of approximately 90° with the surface of the film upon which light impinges so that light rays impinging perpendicularly upon the surface can readily pass between the louvers, while light rays impinging at angles other than perpendicular, but not parallel to the louvers, are to a substantial extent prevented from passing through the film, thereby making it possible to filter out selectively some of the rays of light striking the film.

40. The method of claim 38 in which the louvers are no more than about 50 microns apart on the average and the height of the louvers is at least about equal to the space between louvers, so that light rays striking the film at an angle greater than 45° from perpendicular, and in a direction perpendicular to the louvers, will tend to be filtered out.

41. The method of claim 38 in which the louvers are angled at an angle other than perpendicular to the film surface, thereby favoring transmission of light impinging upon such surface at such other selected angle, over that impinging at perpendicular.

42. The method of claim 38 in which the particles are magnetically alignable.

* * * * *